(12) United States Patent
Przybyla et al.

(10) Patent No.: US 11,016,167 B2
(45) Date of Patent: May 25, 2021

(54) THREE DIMENSIONAL OBJECT-LOCALIZATION AND TRACKING USING ULTRASONIC PULSES

(71) Applicant: Chirp Microsystems, Inc., Berkeley, CA (US)

(72) Inventors: Richard J. Przybyla, Emeryville, CA (US); Mitchell H. Kline, Alameda, CA (US); David A. Horsley, Berkeley, CA (US)

(73) Assignee: CHIRP MICROSYSTEMS, Berkeley, CA (US)

( * ) Notice: Subject to any disclaimer, the term of this patent is extended or adjusted under 35 U.S.C. 154(b) by 77 days.

(21) Appl. No.: 16/463,321

(22) PCT Filed: Nov. 20, 2017

(86) PCT No.: PCT/US2017/062628
§ 371 (c)(1),
(2) Date: May 22, 2019

(87) PCT Pub. No.: WO2018/098085
PCT Pub. Date: May 31, 2018

(65) Prior Publication Data
US 2020/0064439 A1    Feb. 27, 2020

Related U.S. Application Data

(63) Continuation of application No. 15/360,673, filed on Nov. 23, 2016, now Pat. No. 10,545,219.

(51) Int. Cl.
*G01S 5/26* (2006.01)
*G01S 5/02* (2010.01)
(Continued)

(52) U.S. Cl.
CPC .............. *G01S 5/26* (2013.01); *G01S 5/0036* (2013.01); *G01S 5/0263* (2013.01); *G01S 5/18* (2013.01);
(Continued)

(58) Field of Classification Search
CPC ............... G06K 9/00; G06K 7/00; G06K 7/10
(Continued)

(56) References Cited

U.S. PATENT DOCUMENTS 6,246,898 B1    6/2001  Vesely
7,530,030 B2    5/2009  Baudisch
(Continued)

FOREIGN PATENT DOCUMENTS

EP    3073285    9/2016
EP    1914563    4/2018
(Continued)

OTHER PUBLICATIONS

Siciliano, B., Springer, and O. Khatib. "Springer handbook of robotics. 2008." ISBN 354023957X. Springer.
(Continued)

*Primary Examiner* — Edwyn Labaze
(74) *Attorney, Agent, or Firm* — David R. Stevens; Stevens Law Group

(57) ABSTRACT

A tracking method includes displaying visual content on a screen of a head mounted display (HMD). One or more base stations may be stationary with respect to the screen while the visual content is being displayed. In contrast, one or more objects may move with respect to the screen while the visual content is being displayed. Time-difference-of-arrival (TDoA) and/or time-of-flight (ToF) may be measured for one or more ultrasonic pulses transmitted from the base station, one or more objects, or HMD. Position and orientation of the objects and HMD may be calculated based on
(Continued)

the TDoA and ToF. Different frequencies of pulses may be used to locate the HMD and the objects. An electromagnetic synchronization signal from the HMD and/or base station may be used to measure TDoA. Position and orientation measurements may be fused with outputs from IMUS (inertial measurement units) to reduce jitter.

23 Claims, 16 Drawing Sheets

(51) Int. Cl.
*G01S 5/00* (2006.01)
*G01S 5/30* (2006.01)
*G01S 5/18* (2006.01)
*G01S 11/16* (2006.01)
*H04W 56/00* (2009.01)
*G06F 3/00* (2006.01)
*G06K 9/00* (2006.01)

(52) U.S. Cl.
CPC ............... *G01S 5/30* (2013.01); *G01S 11/16* (2013.01); *G06F 3/00* (2013.01); *H04W 56/0015* (2013.01)

(58) Field of Classification Search
USPC .................................. 235/435, 375, 436, 439
See application file for complete search history.

(56) References Cited

U.S. PATENT DOCUMENTS

| | | |
|---|---|---|
| 8,022,862 B2 | 9/2011 | Larocque |
| 8,248,273 B2 | 8/2012 | Hayashi |
| 8,570,914 B2 | 10/2013 | Sauer |
| 8,600,443 B2 | 12/2013 | Kawaguchi |
| 8,614,669 B2 | 12/2013 | Marc |
| 8,644,844 B2 | 2/2014 | Shapira |
| 8,718,478 B2 | 5/2014 | Thelen |
| 8,737,168 B2 | 5/2014 | Somasundaram |
| 8,867,919 B2 | 10/2014 | Logan |
| 8,886,985 B2 | 11/2014 | Somasundaram |
| 8,965,641 B2 | 2/2015 | Smith |
| 8,983,301 B2 | 3/2015 | Baker |
| 9,077,321 B2 | 7/2015 | Rozenbaum |
| 9,158,864 B2 | 10/2015 | Berlin |
| 9,184,843 B2 | 11/2015 | Berlin |
| 9,299,019 B2 | 3/2016 | Rasmussen |
| 9,560,439 B2 | 1/2017 | Mehra |
| 9,590,733 B2 | 3/2017 | George |
| 9,609,070 B2 | 3/2017 | Shapira |
| 9,625,567 B2 | 4/2017 | Lim |
| 9,648,580 B1 | 5/2017 | Shekalim |
| 2002/0024675 A1* | 2/2002 | Foxlin ............... G06F 3/0346 356/620 |
| 2003/0045816 A1* | 3/2003 | Foxlin ............... G01S 5/186 600/595 |
| 2003/0081502 A1 | 5/2003 | Welke |
| 2005/0197680 A1 | 9/2005 | DelMain |
| 2008/0279044 A1 | 11/2008 | Hafer et al. |
| 2009/0262604 A1 | 10/2009 | Funada |
| 2010/0128568 A1 | 5/2010 | Han et al. |
| 2010/0278012 A1 | 11/2010 | Tremper |
| 2012/0127284 A1 | 5/2012 | Bar-Zeev |
| 2013/0007668 A1 | 1/2013 | Liu |
| 2014/0043943 A1 | 2/2014 | Lavery |
| 2014/0055352 A1 | 2/2014 | Davis |
| 2014/0290368 A1 | 10/2014 | Guo |
| 2015/0323667 A1 | 11/2015 | Przybyla et al. |
| 2016/0084937 A1 | 3/2016 | Lin |
| 2017/0195936 A1* | 7/2017 | Want .................. G01S 5/30 |
| 2017/0307891 A1* | 10/2017 | Bucknor ............... G01S 1/70 |
| 2017/0367578 A1 | 12/2017 | Melodia |
| 2018/0180732 A1 | 6/2018 | Sestok |

FOREIGN PATENT DOCUMENTS

| | | |
|---|---|---|
| WO | 1999053838 A1 | 10/1999 |
| WO | 2014/131894 | 9/2014 |
| WO | 2014131894 A2 | 9/2014 |
| WO | 2014/207666 | 12/2014 |
| WO | 2016/174659 | 11/2016 |

OTHER PUBLICATIONS

Li, Yingzhu. Development of Immersive and Interactive Virtual Reality Environment for Two-Player Table Tennis, Mar. 2012.

Intersense, Inc., User Guide Is-900 SimTracker & VETracker with MicroTraxTM Devices, 2007.

Vlasic, Daniel et al., Practical Motion Capture in Everyday Surroundings, ACM Transaction on Graphics, vol. 26, No. 3, Article 35, Jul. 2007.

* cited by examiner $$T_d > \frac{D}{C} + T_p$$

THREE DIMENSIONAL OBJECT-LOCALIZATION AND TRACKING USING ULTRASONIC PULSES

RELATED APPLICATION

This application is a continuation-in-part of U.S. application Ser. No. 15/360,673 filed Nov. 23, 2016 and entitled THREE DIMENSIONAL OBJECT-LOCALIZATION AND TRACKING USING ULTRASONIC PULSES, which is hereby incorporated herein by reference in its entirety.

STATEMENT REGARDING FEDERALLY SPONSORED RESEARCH OR DEVELOPMENT

This invention was made with Government support under IIP-1456376 awarded by the National Science Foundation. The Government has certain rights in this invention. See 45 C.F.R. 650.4(f)(4).

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. 1.14.

FIELD OF THE INVENTION

This invention relates to localization and tracking and more particularly to systems and methods for estimating relative location and/or relative orientation based on ultrasonic time-of-flight and/or time-difference-of-arrival measurements.

BACKGROUND OF THE INVENTION

Virtual reality (VR) systems, augmented reality (AR) systems, and the like often require information characterizing the motion of a controller. To provide that information, a controller sometimes will include an inertial measurement unit (IMU). However, IMUS are subject to accumulated error and often cannot alone provide the granularity of information that is needed or desired. Accordingly, what are needed are improved systems and methods for tracking controllers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for localization and tracking of objects and, more particularly, using periodic ultrasonic pulses to determine location and/or orientation between one or more components in three dimensional space.

Figure 1:
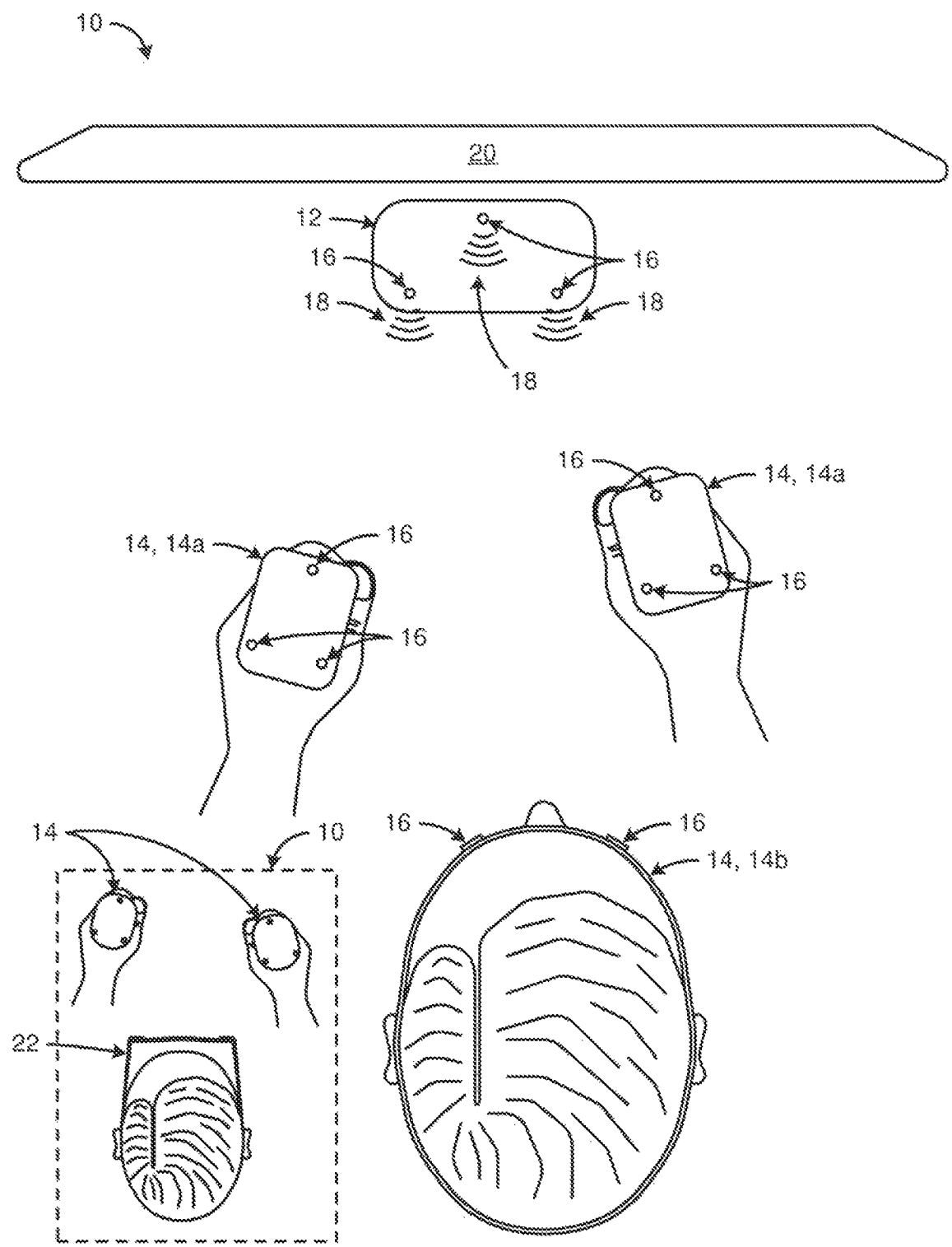
FIG. 1 is a schematic diagram illustrating a top view of one embodiment of a system in accordance with the present invention as the system is being used by a human user.

Referring to FIG. 1, a system 10 in accordance with the present invention may include a base station 12 and one or more tracked objects 14 whose relative location and/or orientation with respect to the base station 12 may be tracked. Tracked objects 14 may be free to move with respect to one another and with respect to a base station 12. For example, one or more tracked objects 14 may be manipulated (e.g., translated, rotated, or some combination thereof) in three dimensional space by one or more human users of a system 10. In certain embodiments, a base station 12 may also be manipulated (e.g., translated, rotated, or some combination thereof) in three dimensional space by one or more human users of a system 10.

In selected embodiments, each of the base station 12 and one or more tracked objects 14 may include one or more ultrasonic transducers 16 that selectively transmit and/or receive one or more ultrasonic pulses 18. The locations of all the transducers 16 on a base station 12 and the locations of all the transducers 16 on one or more tracked objects 14 may be known based on the mechanical design of the base station 12 and one or more tracked objects 14, respectively. Accordingly, information corresponding to the one or more ultrasonic pulses 18 (e.g., time-difference-of-arrival, time-of-flight, or the like) may be used to estimate the relative locations and/or orientations of the base station 12 and one or more tracked objects 14 with respect to one another.

In selected embodiments, the relative locations and/or orientations of a base station 12 and one or more tracked objects 14 may be described in terms of predetermined or pre-identified reference points. For example, the location and/or orientation of a tracked object 14 or base station 12 may be described or communicated in terms of a centroid or center of mass thereof. Alternatively, the predetermined or pre-identified reference point of a tracked object 14 and/or base station 12 may be an IMU that forms part of the same.

In certain embodiments, a system 10 may enable one or more human users thereof to interact with or participate in a virtual reality (VR) environment, mediated reality (MR) environment, augmented reality (AR) environment, remote surgery (also known as telesurgery), or the like. Accordingly, in certain embodiments, a system 10 may include one or more screens 20.

A screen 20 may display visual content. Movements imposed by one or more users on a base station 12, one or more tracked objects 14, or some combination thereof may be detected and used in some manner to affect, change, or interact with the visual content displayed on a screen 20. For example, in certain embodiments, at least a portion of that visual content displayed on a screen 20 may be virtual. Accordingly, movements imposed by one or more users on a base station 12, one or more tracked objects 14, or some combination thereof may be tracked and used to alter, control, or the like the virtual content.

In certain "tethered" embodiments, a system 10 may be or form part of a VR, MR, AR, and/or telesurgery system or the like wherein certain operations (e.g., the computation necessary for tracking) are performed on a personal computer (PC) or gaming console that is connected to a head-mounted display (HMD) 22. In such embodiments, a base station 12 may be included as part of the HMD 22 or may rest stationary with respect to, connect directly to, and/or form part of or an extension to the PC or gaming console. Accordingly, in selected embodiments, an HMD 22 may be a tracked object 14 that includes one or more screens 20.

In certain "untethered" embodiments, a system 10 in accordance with the present invention may be or form part of a VR, MR, AR, and/or telesurgery system or the like wherein controller tracking (e.g., tracking of one or more tracked objects 14 such as one or more hand-held controllers) and head tracking are performed on an HMD 22 that includes a base station 12 and one or more screens 20.

Accordingly, in selected embodiments, while a system 10 is operating or in use, a base station 12 may be maintained or left in a stationary relationship with respect to the earth and/or with respect to one or more screens 20. For example, in selected embodiments, a base station 12 of a system 10 may sit (e.g., rest in a stationary manner) on a desk, table, or other supporting surface. One or more screens 20 of the system 10 may also sit (e.g., rest in a stationary manner) on a desk, table, or other supporting surface. Accordingly, the base station 12 and one or more screens 20 may be stationary with respect to the earth and with respect to one another.

Alternatively, a base station 12 may be moved by a user while a system 10 is operating or in use. For example, in certain embodiments, a base station 12 and one or more screens 20 may be incorporated within or form part of a head-mounted display (HMD) 22. Accordingly, the base station 12 and one or more screens 20 may be stationary with respect each other, yet move with respect to the earth as dictated by a human user.

Tracked objects 14 in accordance with the present invention may have any suitable form. For example, a tracked object 14 may be a hand-held controller 14a or wand 14a, ring, wrist band, glove (e.g., a glove with one or more ultrasonic transducers 16 on each finger to enable the location and/or orientation of each finger or finger joint to be tracked). Alternatively, or in addition thereto, one or more tracked objects 14 may correspond to something other than a user's hands. For example, one or more tracked objects 14 may be mounted to or worn on other body parts such as arms, legs, feet, and/or head. For example, a tracked object 14 may be a head-worn device such as a hat, visor, head band 14b, pair of glasses or goggles, face mask, or the like or a combination or sub-combination thereof.

Figure 2:
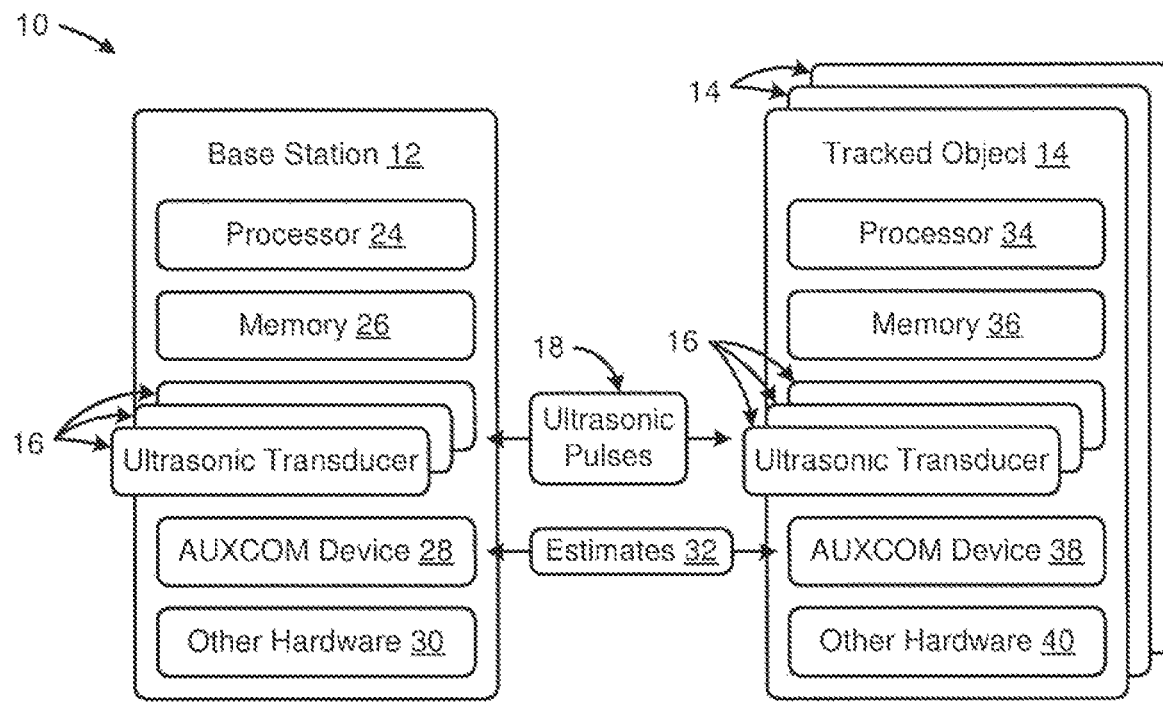
FIG. 2 is a schematic block diagram illustrating one embodiment of the internal makeup of various components of a system in accordance with the present invention.

Referring to FIG. 2, a base station 12 in accordance with the present invention may transmit one or more ultrasonic pulses 18, receive one or more ultrasonic pulses 18, use one or more time-difference-of-arrival and/or time-of-flight measurements to estimate its relative location and/or orientation with respect to one or more tracked objects 14, receive estimates 32 of the relative location and/or orientation of one or more tracked objects 14 with respect thereto, or the like or a combination or sub-combination thereof. A base station 12 may accomplish this in any suitable manner. For example, a base station 12 may be embodied as hardware, software, or some combination thereof.

In selected embodiments, a base station 12 may include computer hardware, other electrical hardware, and computer software. For example, the hardware of a base station 12 may include one or more processors 24, memory 26, one or more ultrasonic transducers 16, one or more auxiliary communications devices 28, other hardware 30 as desired or necessary, or the like or a combination or sub-combination thereof.

The memory 26 of a base station 12 in accordance with the present invention may be operably connected to one or more processors 24 and store data, computer software, or some combination thereof. This may enable one or more processors 24 to execute the computer software, operate on the data, or the like. Accordingly, one or more processors 24 may control one or more operations (e.g., all operations) of a base station 12 by running computer software stored in memory 26.

Each of the ultrasonic transducers 16 of a base station 12 may convert electrical signal into corresponding ultrasonic waves and/or convert ultrasonic waves into corresponding electrical signal. Moreover, each of the ultrasonic transducers 16 of a base station 12 may be embodied within a different ultrasonic receiver, ultrasonic transmitter, or ultrasonic transceiver. Accordingly, operating in conjunction with other supporting hardware 30 and/or software systems stored in memory 26 (e.g., hardware and/or software modulators, demodulators, or the like), each ultrasonic transducer 16 of a base station 12 may be an independent source or recipient of one or more ultrasonic transmissions. In selected embodiments, a base station 12 may include three or more ultrasonic transducers 16, each embodied within or forming part of a different ultrasonic transceiver.

A base station 12 may communicate with (i.e., send information to and/or receive information from) one or more tracked objects 14. For example, in selected embodiments, each tracked object 14 may use one or more ultrasonic pulses 18 transmitted by a base station 12 to estimate its location and/or orientation with respect to the base station 12. Accordingly, communication between the base station 12 and the one or more tracked objects 14 may enable the base station 12 to receive the location and/or orientation estimates 32 generated by the one or more tracked objects 14.

A base station 12 may communicate with one or more tracked objects 14 in any suitable manner. In selected embodiments, a base station 12 may communicate with one or more tracked objects 14 by encoding and/or decoding information within one or more ultrasonic transmissions. Alternatively, a base station 12 and one or more tracked objects 14 may use ultrasonic transmissions for localization and tracking and may use an auxiliary communication path (e.g., wireless radio transmission, wired serial communication, or the like) to communicate (e.g., receive estimates 32). In such embodiments, an auxiliary communication device 28 may provide, enable, or support the auxiliary communication path. In selected embodiments, an auxiliary communication device 28 of a base station 12 may comprise a radio transceiver configured to transmit and/or receive encoded UHF radio waves (e.g., radio communication compliant with a BLUETOOTH standard or the like).

A tracked object 14 in accordance with the present invention may transmit one or more ultrasonic pulses 18, receive one or more ultrasonic pulses 18, use one or more time-difference-of-arrival and/or time-of-flight measurements to estimate its relative location and/or orientation with respect to a corresponding base station 12, transmit estimates 32 of its relative location and/or orientation to a corresponding base station 12 or the like or a combination or sub-combination thereof. A tracked object 14 may accomplish this in any suitable manner. For example, a tracked object 14 may be embodied as hardware, software, or some combination thereof.

In selected embodiments, a tracked object 14 may include computer hardware, other electrical hardware, and computer software. For example, the hardware of a tracked object 14 may include one or more processors 34 (e.g., microprocessors), memory 36, one or more ultrasonic transducers 16, one or more auxiliary communications devices 38, other hardware 40 as desired or necessary, or the like or a combination or sub-combination thereof.

The memory 36 of a tracked object 14 in accordance with the present invention may be operably connected to one or more processors 34 and store data, computer software, or some combination thereof. This may enable one or more processors 34 to execute the computer software, operate on the data, or the like. Accordingly, one or more processors 34 may control one or more operations (e.g., all operations) of a tracked object 14 by running computer software stored in memory 36.

Each of the ultrasonic transducers 16 of a tracked object 14 may convert electrical signal into corresponding ultrasonic waves and/or convert ultrasonic waves into corresponding electrical signal. Moreover, each of the ultrasonic transducers 16 of a tracked object 14 may be embodied within a different ultrasonic receiver, ultrasonic transmitter, or ultrasonic transceiver. Accordingly, operating in conjunction with other supporting hardware 40 and/or software systems stored in memory 36 (e.g., hardware and/or software based modulators, demodulators, or the like), each ultrasonic transducer 16 of a tracked object 14 may be an independent source or recipient of one or more ultrasonic transmissions.

In selected embodiments, one or more tracked objects 14 within a system 10 may each include three transducers 16, each embodied within or forming part of a different ultrasonic transceiver. This may enable three vectors (e.g., in Cartesian coordinates (x1, y1, z1), (x2, y2, z2), (x3, y3, z3)) respectively representing the coordinates of the three transducers 16 with respect to a base station 12 to be calculated using time-difference-of-arrival and/or time-of-flight measurements collected for one or more ultrasonic pulses 18. Accordingly, when a tracked object 14 has more than one transducer 16, the respective coordinate vectors of the transducers 16 may be used, along with the known locations of the transducers 16 on the tracked object 14, to determine both the location and orientation of the tracked object 14 relative to a corresponding base station 12.

A tracked object 14 may communicate with (i.e., send information to and/or receive information from) a base station 12. For example, in selected embodiments, a tracked object 14 may transmit to a corresponding base station 12 the location and/or orientation estimates 32 prepared by the tracked object 14. In selected embodiments, a tracked object 14 may communicate with a base station 12 by encoding and/or decoding information within one or more ultrasonic transmissions. Alternatively, an auxiliary communication device 38 may provide, enable, or support an auxiliary communication path between a tracked object 14 and a base station 12. In selected embodiments, an auxiliary communication device 30 of a target object 14 may comprise a radio transceiver configured to transmit and/or receive encoded UHF radio waves (e.g., radio communication compliant with a BLUETOOTH standard or the like).

In selected embodiments, time-of-flight measurements may be used to estimate a relative three dimensional location and/or orientation of one or more tracked objects 14 with respect to a base station 12. For example, in one or more measurement cycles, an ultrasonic pulse 18 may be transmitted by a transducer 16 on a tracked object 14 and received by three or more transducers 16 on a base station 12. From the three or more time-of-flight measurements, the known speed of sound in the environment surrounding the system 10, and the known location of the three or more transducers 16 on the base-station 12, the hardware and/or software of the base station 12 may use a trilateration algorithm to find the coordinates of the transmitting transducer 16 relative to the base station 12.

In other embodiments, the process may be reversed. That is, in one or more measurement cycles, three or more transducers 16 on a base station 12 may transmit an ultrasonic pulse 18 to a tracked object 14. Using the three or more time-of-flight measurements, the known speed of sound in the environment surrounding the system 10, and the known locations of the three or more transducers 16 on the base station 12, each transducer 16 on the tracked object 14 may use a trilateration algorithm to find its coordinates relative to the base station 12.

When using ultrasonic pulses 18 to estimate relative location and/or orientation, it may be desirable or necessary to have a mechanism for distinguishing the ultrasonic pluses 18 emanating from one transducer 16 from the ultrasonic pulses 18 emanating from another. Accordingly, in certain embodiments, each transmitting transducer 16 on a base station 12 and/or tracked object 14 may transmit ultrasonic pulses 18 encoded with identifying information.

That is, each ultrasonic pulse 18 may be encoded with a distinct identification code that allows any recipient thereof within a system 10 to identify the transducer 16 that generated the ultrasonic pulse 18. Various encoding schemes may be used to encode such identifications. In certain embodiments, information identifying sources of one or more ultrasonic pulses 18 may be encoded using phase-shift keying (PSK) such as quadrature phase-shift keying (QPSK) or differential phase-shift keying (DPSK). Other encoding approaches may be used to identify sources of pulses including frequency, amplitude, codes, or the like.

Figure 3:
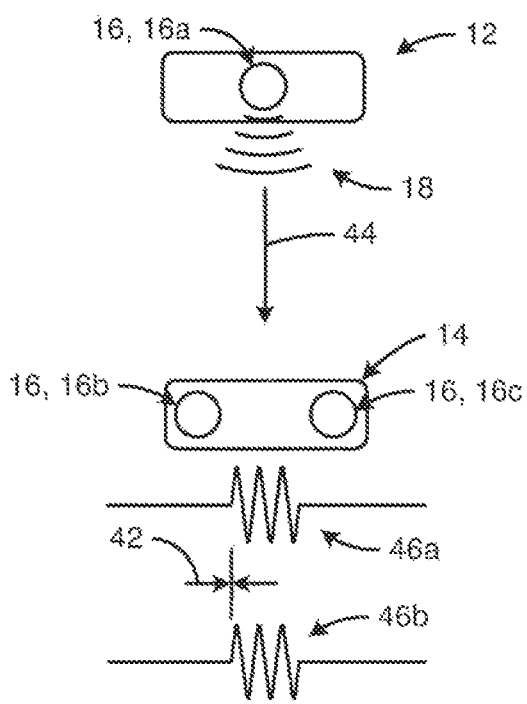
FIG. 3 is a schematic diagram illustrating a moment in time when a tracked object has a normal or directly "face-on" orientation with respect to a base station.
Figure 4:
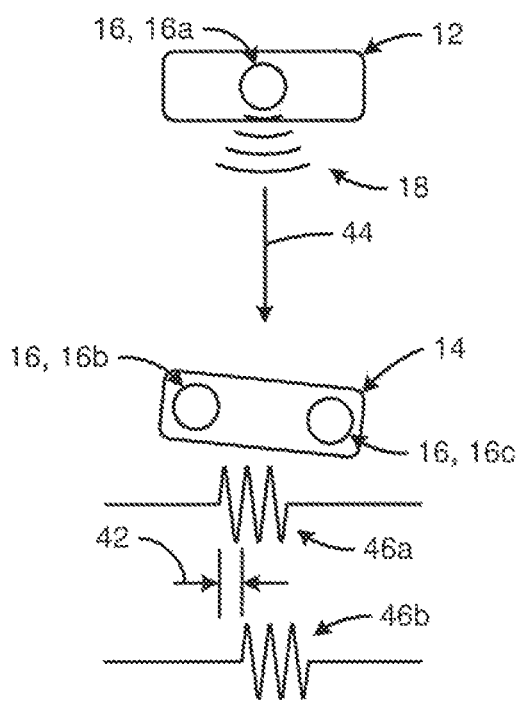
FIG. 4 is a schematic diagram illustrating a moment in time when a tracked object has deviated somewhat from a normal or directly "face-on" orientation with respect to a base station.

Referring to FIGS. 3 and 4, in selected embodiments, the three dimensional location and/or orientation of one or more tracked objects 14 relative to one or more transducers 16 of a base station 12 may be determined based on a time-difference-of-arrival 42 of an ultrasonic pulse 18. A two-dimensional example of this is illustrated. For this illustrative example, a first transducer 16a is located on a base station 12. Second and third transducers 16b, 16c are located on a tracked object 14. At the moment in time illustrated in FIG. 3, the tracked object 14 has a normal orientation relative to a propagation axis 44 of an ultrasonic pulse 18. Moreover, in this normal orientation, the two transducers 16b, 16c of the tracked object 14 are equidistant from the transducer 16a on the base station 12. As a result, the ultrasonic pulse 18 will reach the second and third transducers 16b, 16c at the same time.

Accordingly, the hardware and/or software of the tracked object 14 may compare the time-of-arrival of the ultrasonic pulse 18 in the output 46a of the second transducer 16b to the time-of-arrival of the ultrasonic pulse 18 in the output 46b of the third transducer 16c. For the moment in time illustrated in FIG. 3, the difference of these two times (i.e., the time-difference-of-arrival 42) is zero. Accordingly, the tracked object 14 may know that the second and third transducers 16b, 16c are equidistant from the first transducer 16c. Knowing this, the tracked object 14 may further know that at this particular moment in time, it has a normal orientation relative to the propagation axis 44 of the ultrasonic pulse 18.

At the moment in time illustrated in FIG. 4, the tracked object 14 has rotated slightly away from a normal orientation relative to a propagation axis 44 of an ultrasonic pulse 18. As a result, the ultrasonic pulse 18 will reach the second transducer 16b before it reaches the third transducer 16c.

Accordingly, the hardware and/or software of the tracked object 14 may compare the time-of-arrival of the ultrasonic pulse 18 in the output 46a of the second transducer 16b to the time-of-arrival of the ultrasonic pulse 18 in the output 46b of the third transducer 16c. For the moment in time illustrated in FIG. 4, the difference of these two times (i.e., the time-difference-of-arrival 42) may be some non-negligible value. Accordingly, knowing the time-difference-of-arrival 42, the distance between the second and third transducers 16b, 16c, and the speed of sound in the environment surrounding the tracked object 14, the hardware and/or software of the tracked object 14 may estimate how far it has deviated from a normal orientation relative to the propagation axis 44 of the ultrasonic pulse 18.

While this illustrative example deals with only two dimensions, the concepts explained above may be easily expanded to three dimensions. Specifically, three non-collinear transducers 16 on a tracked object 14 may allow the three orientation angles (e.g., $\theta x$, $\theta y$, $\theta z$) of the tracked object 14 to be determined. Additionally, with three non-collinear transducers 16 on a tracked object 14 and three non-collinear transducers 16 on a base station 12, time-difference-of-arrival may be used to estimate the relative orientation of both components 12, 14.

In comparison to time-of-flight measurements, time-difference-of-arrival 42 measurements do not require knowledge of when the ultrasonic pulse 18 at issue was transmitted by a base station 12. Only a local timing reference on the tracked object 14 may be needed. In addition, while the minimum time-of-flight measurement period may be limited by the propagation time of an ultrasonic pulse 18 from base station 12 to tracked object 14 (which is approximately 3 milliseconds for a separation of about 1 meter), the time difference-of-arrival can be measured at a high update rate. Typically, the maximum update rate may depend only on the time duration of the transmitted ultrasonic pulse 18. Accordingly, in an embodiment employing ultrasonic transducers 16 with 5 kHz bandwidth, the time-difference-of-arrival 42 may be measured 5000 times per second, providing orientation estimates for the tracked object 14 at a high update rate.

Figures 5, 6:
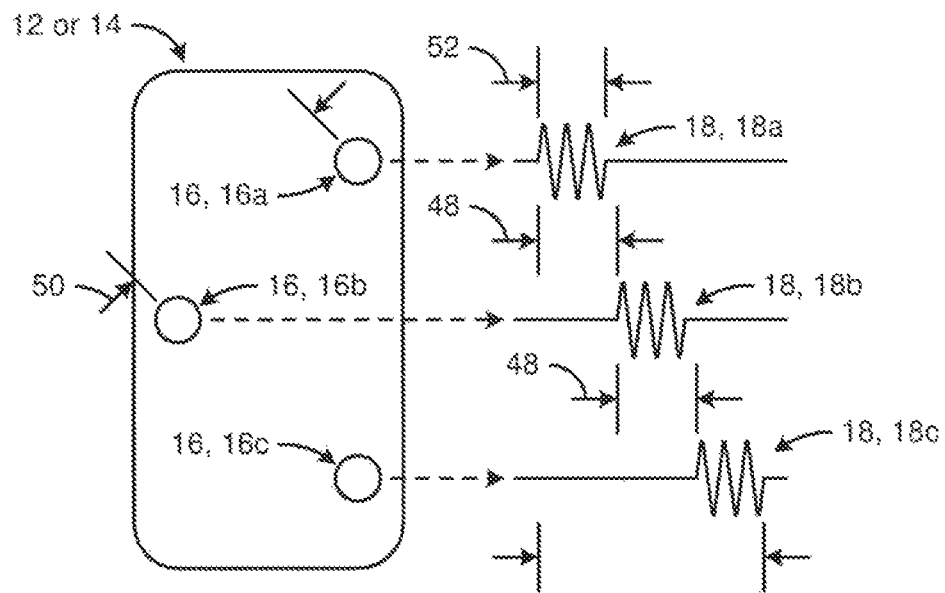
FIG. 5 is a schematic diagram illustrating a base station or tracked object emitting three ultrasonic pulses in series with a time delay between each ultrasonic pulse.
FIG. 6 is an illustration of one mathematical formula that may be used to calculate a time delay between ultrasonic pluses that are transmitted in series.

Referring to FIGS. 5 and 6, a system 10 in accordance with the present invention may employ a timing scheme to enable ultrasonic pulses 18 to be transmitted in sequence from a tracked object 14 to the base station 12 or vice versa without interfering with one another. For example, in a first measurement cycle, three non-collinear transducers 16a, 16b, 16c on a base station 12 or tracked object 14 may be triggered to send first, second, and third ultrasonic pulses 18a, 18b, 18c in sequence. Each ultrasonic pulse 18a, 18b, 18c may be delayed with respect to an immediately preceding ultrasonic pulse 18 by a time-delay 48 that is selected to ensure that the ultrasonic pulses 18a, 18b, 18c are separated (i.e., do not overlap) in their time of arrival at a receiving transducer 16.

For first and second transducers 16a, 16b separated by a particular distance 50, the time-delay 48 between ultrasonic pulses 18 having a particular duration 52 and traveling at a particular speed 54 (i.e., the speed of sound in the environment surrounding a system 10) may be greater than the particular pulse duration 52 plus the particular distance 50 divided by the particular speed 54. When the time delay 48 meets this requirement, the two pulses 18*a*, 18*b* will have distinct (e.g., non-overlapping) times-of-arrival at any receiving transducer 16.

A similarly calculated time delay 48 may ensure that the pulses 18*b*, 18*c* of the second and third transducers 16*b*, 16*c* will have distinct times-of-arrival at any receiving transducer 16. Moreover, cumulative time delays 48 will ensure that the pulses 18*a*, 18*c* of the first and third transducers 16*a*, 16*c* will have distinct times-of-arrival at any receiving transducer 16.

Accordingly, by measuring the absolute time-of-flight and/or time-difference-of-arrival of the three pulses 18*a*, 18*b*, 18*c* using a trilateration algorithm, the relative range and/or orientation of base station 12 and corresponding tracked object 14 may be estimated. In selected embodiments, it may be desirable to extend the time delay 48 above the amount calculated above so that reflections (e.g., multipath ultrasonic pulses) from nearby objects do not create interference between sequential ultrasonic pulses 18.

In selected embodiments, each transducer 16 that is not transmitting may receive in order to hear ultrasonic pulses 18 from neighboring transducers 16 (e.g., transducers 16 located on the same base station 12 or tracked object 14). For example, a first transducer 16*a* may transmit a first ultrasonic pulse 18*a*. That pulse 18*a* may be received by second and/or third transducers 16*b*, 16*c*. Accordingly, a time-of-flight estimate between the first transducer 16*a* and the second and/or third transducers 16*b*, 16*c* may be determined. If the distances between the various transducers 16*a*, 16*b*, 16*c* are fixed and known, such time-of-flight estimates may be used to detect and compensate for variations in the speed of sound caused by environmental changes. Alternately, if the distances between the various transducers 16*a*, 16*c*, 16*b* are unknown or vary over time (e.g., the transducers 16*a*, 16*b*, 16*c* are mounted on a flexible substrate or composed of separate tags), such time-of-flight estimates may be used to detect and/or compensate for variations in the spacing between neighboring transducers 16*a*, 16*b*, 16*c*.

Figure 7:
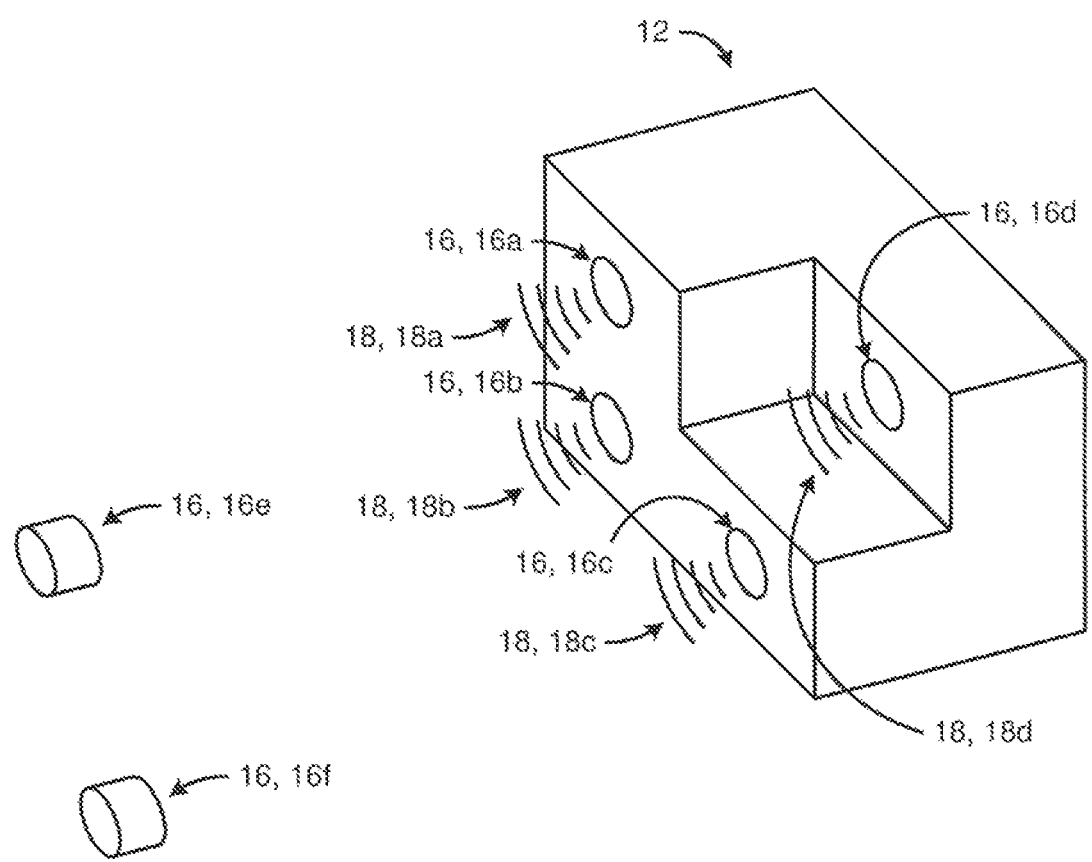
FIG. 7 is a schematic illustration of a one embodiment of a base station comprising more than three ultrasonic transducers.

Referring to FIG. 7, in selected embodiments, a base station 12 may comprise more than three transducers 16 in order to provide, enable, or support trilateration with time recovery. For example, a base station 12 may include or comprise four transducers 16*a*, 16*b*, 16*c*, 16*d*. Within each measurement cycle, each transducer 16*a*, 16*b*, 16*c*, 16*d* may generate or output a corresponding ultrasonic pulse 18*a*, 18*b*, 18*c*, 18*d*. The ultrasonic pulses 18*a*, 18*b*, 18*c*, 18*d* may be transmitted in series with a time delay 48 that is fixed and known.

The ultrasonic pulses 18*a*, 18*b*, 18*c*, 18*d* may be received by one or more receiving transducers 16*e*, 16*f*. Accordingly, for each receiving transducer 16*e*, 16*f* (e.g., one or more transducers 16 forming part of one or more tracked objects 14), its three dimensional location relative to the base station 12 based on the time-difference-of-arrival of the four ultrasonic pulses 18*a*, 18*b*, 18*c*, 18*d* may be estimated using trilateration with time recovery.

In such an embodiment, the absolute time of the start of the transmit phase on the base station 12 (e.g., the transmit time at which the first ultrasonic pulse 18 of the measurement cycle was initiated) may be unknown. To enable recovery of the relative three dimensional location and the transmit time, at least one 16*d* of the four transducers 16*a*, 16*b*, 16*c*, 16*d* may be positioned so at to be non-coplanar with the others 16*a*, 16*b*, 16*c*. Accordingly, the relative three dimensional location of each receiving transducers 16*e*, 16*f* (x, y, z) and the start of the transmit phase may be recovered from the four arrival times at each receiving transducers 16*e*, 16*f*.

In such an embodiment, a relative location corresponding to each receiving transducer 16*e*, 16*f* may be estimated by one or more processors 34 of one or more corresponding tracked objects 14, rather than by one or more processors 24 of the base station 12. The computation may be done using a least squares algorithm or the like, in which an unlimited number of transmitting transducers 16 may be used in order to improve the estimate 32 corresponding to each receiving transducer 16. One advantage of this embodiment is that a single base station 12 may enable an unlimited number of tracked objects 14 to locate themselves. Another advantage is that additional transmitting transducers 16 may be added to a base station 12 to extend the field of view and/or improve the accuracy of the position estimates 32.

As disclosed above, in certain embodiments, only the time-difference-of-arrival of an ultrasonic pulse 18 may be required to determine the location and/or orientation of a tracked object 14 relative to a base station 12. In other embodiments, the time-of-flight of an ultrasonic pulse 18 may be measured and used to calculate location and orientation.

The time-of-flight may be equal to the time-of-arrival (i.e., when the ultrasonic pulse 18 is received at a receiving transducer 16) minus the transmit time (i.e., the time at which the ultrasonic pulse 18 was initiated). Because the transmitting transducer 16 may be (is typically) located on a separate component 12, 14 from the receiving transducer 16, the transmit time may not be known precisely at the object 12, 14 of the receiving transducer 16. Accordingly, in selected embodiments, the transmit time may be obtained by synchronizing a transmitting transducer 16 and a receiving transducer 16 using radio frequency pulses, optical pulses, ultrasonic pulses 18 (e.g., ultrasonic pulses 18 that are not being used to estimate location and/or position), or the like.

For example, at some point in time a base station 12 and one or more tracked objects 14 may not be synchronized. Accordingly, the base station 12 may emit an ultrasonic trigger pulse 18 that travels to the tracked object 14. Meanwhile, the tracked object 14 may have concluded a receiving phase before the ultrasonic trigger pulse 18 arrives. Accordingly, the tracked object 14 may not detect the ultrasonic trigger pulse 18. The base station 12 may wait out a reference delay (e.g., a delay of about 0 to about 100 milliseconds or, more preferably, about 2 milliseconds to about 20 milliseconds) and begin its own receiving phase, during which it may or may not receive a reply from tracked object 14.

In the situation that the tracked object 14 is not synchronized with the base station 12 and does not detect an ultrasonic trigger pulse 18, the tracked object 14 may wait a predetermined period of time after the beginning of one receiving phase before starting a subsequent receiving phase. The predetermined period of time may be chosen such that the tracked target 14 has a reliably different period than the base station 12. For example, if the base station 12 is configured to transmit every 100 milliseconds, the tracked object 14 may be configured to receive every 90 milliseconds. Accordingly, the tracked object 14 will eventually detect a transmission from the base station 12 even with arbitrary initial timing conditions.

Continuing the process, the base station 12 may emit another ultrasonic triggering pulse 18 after the appropriate time has passed since the last ultrasonic triggering pulse 18.

In the event that the tracked object 14 hears this second ultrasonic triggering pulse 18, the tracked object 14 may start and wait out a reference delay (e.g., a delay of about 0 to about 100 milliseconds or, more preferably, about 2 milliseconds to about 20 milliseconds) and then generate a reply pulse 18. In this exemplary situation, the base station 12 may receive the reply pulse 18 during its second receive phase.

Accordingly, the time between the start of second receive phase of the base station 12 and the arrival of the reply pulse 18 may be equal to the round trip time-of-flight between base station 12 and the tracked object 14 plus the difference of the reference delay of the tracked object 18 and the reference delay of the base station 12 plus the difference of any timing errors introduced by the tracked object 14 and the base station 12. In selected embodiments, this estimate of the round trip time-of-flight may be used together with the known speed of sound to obtain a first, relatively rough estimate of the range between the tracked object 14 and the base station 12.

After a tracked object 14 sends reply pulse 18, it may wait a variable time delay. In selected embodiments, it may be desirable for ultrasonic pulses 18 to arrive at the center of the receive phases of a tracked object 14 in order to minimize the probability of missed transmissions due to incorrect receive-phase timing. If a tracked object 14 is moving with respect to a base station 12, the arrival time of ultrasonic pulses 18 may be variable. Furthermore, the clocks on a base station 12 and/or tracked object 14 may have frequency errors or drift that contribute to inaccurate timing of the receive phases. For this reason, a delay-locked feedback loop may be used to ensure that a base station 12 and tracked object 14 operate with the same period and to ensure that receive phases of a tracked object 14 coincide with the arrival times of ultrasonic pulses 18 emitted by the base station 12.

In selected embodiment, a fixed delay based on the predetermined period of a base station 12 may be added to an error signal equal to the difference of the time-of-arrival of an ultrasonic pulse 18 and the center of a corresponding receive phase to create a variable time delay such that the subsequent ultrasonic pulses 18 should arrive at the center of a receive phase. This process may be repeated for each receive phase to form a delay-locked feedback loop that acts to lock the center of the receive phase to the arrival time of the ultrasonic pulses 18.

A delay-locked feedback loop may act to measure the error between the predetermined period of a base station 12 and the period of a tracked target 14 and to drive this error to zero. Since the adjustment of the variable time delay may affect all subsequent measurements, the error signal may, in effect, be integrated by the delay-locked feedback loop. This may result in a first-order integrator loop that cancels the error within the delay resolution of the variable time delay.

As in any feedback controller, higher order control loops that contain proportional, integral, or derivative paths may be used. It may be noted that for implementations or situations in which the tracked object 14 is moving, the delay-lock loop parameters (including the duration of the receive phase) may be configured to ensure that the receive signal doesn't drop out due to rapid changes in the path length between the tracked object 14 and the base station 12. In certain embodiments, this may be accomplished by assuming a maximum velocity of the tracked object 14 relative to the base station 12.

In selected embodiments, by measuring the error between the predetermined period of a base station 12 and the period of a tracked target 14 and driving this error to zero, a system 10 may obtain accurate time-of-flight measurements. Thereafter, a system 10 may use such measurements to estimate location and/or orientation of one or more tracked objects 14 relative to a base station 12.

In certain embodiments, ultrasonic pulses 18 used for synchronization purposes (e.g., ultrasonic triggering pulses 18, reply pulses 18, or the like) may be sent with each time-of-flight measurement. In other embodiments, synchronization pulses 18 may be transmitted at a lower rate (e.g., once every ten time-of-fight measurements, once every then thousand time-of-flight measurements, or the like). In such embodiments, an estimate of the transfer time may be maintained using a local oscillator on each side 12, 14 of the exchange.

In certain embodiments, radio waves may be used for synchronization purposes in the place ultrasonic pulses 18. In such embodiments, radio-wave synchronization may proceed according to the method described above for ultrasonic synchronization, but with the ultrasonic triggering pulse 18 being replaced by a corresponding radio synchronization packet and the propagation time of the radio synchronization packet being considered negligible given the synchronization accuracy required.

Accordingly, in embodiments incorporating radio synchronization, a base station 12 may transmit a radio synchronization packet at regular intervals. Each tracked object 14 may use a local clock to keep time and to enable (e.g., activate, monitor) a radio receiver forming part of the tracked object 14 prior to the time at which the radio synchronization packet is expected to arrive. Each tracked object 14 may record the arrival time of the radio synchronization packet and use this to ensure that the local clock is synchronized to the clock on base station 12 and that the radio receiver is enabled during the times when the base station 12 transmits the radio synchronization packets.

Additionally, the arrival of a radio synchronization packet may be used by a tracked object 14 to subsequently trigger the start of an ultrasonic receiving phase. In such embodiments, a base station 12 may emit a radio synchronization packet followed immediately by an ultrasonic pulse 18. A tracked object 14 may therefore record the one-way ultrasonic time-of-flight between the base station 12 and the tracked object 14, less the radio propagation time, which may be considered negligible.

In selected embodiments, the arrival of a radio synchronization packet may be used to update a local clock on a tracked object 14 to ensure that it is synchronized with a clock on base station 12. The clocks on the base station 12 and the tracked object 14 may then be used to synchronize the start of a transmitting phase on the base station 12 in which an ultrasonic pulse 18 is transmitted from base station 12 and a receiving phase on the tracked object 14 in which the tracked object 14 listens for and receives the ultrasonic pulse 18. In such embodiments, radio synchronization may be performed prior to each ultrasonic transmission or at a different rate according to the requirements of the application, jitter of the radio synchronization, drift of the clocks, or the like.

It certain embodiments, the roles of a base station 12 and one or more tracked objects 14 may be reversed. Accordingly, a base station 12 may receive ultrasonic pulse 18 from one or more tracked objects 14 or a base station 12 and one or more tracked objects 14 may take turns emitting ultrasonic pulses 18. In selected embodiments, a round-robin technique may be used in order to ensure that ranges between all tracked objects 14 and base stations 12 are measured. For instance, two tracked objects 14 may measure the range between them (e.g., by initiating a transmit phase on one tracked object 14 and a receiving phase on a second tracked object 14) after the tracked objects 14 are synchronized to each other (e.g., through a base station 12 or by each being synchronized with a base station 12 and, hence, with each other).

In selected embodiments, a base station 12 may comprise one or more transducers 16 or groups of transducers 16 on separate sub-assemblies. These sub-assemblies assemblies may be synchronized via the radio or ultrasonic methods disclosed above such that the base station 12 may operate as if it were composed of one assembly. Accordingly, in certain embodiments, three or more separate sub-assemblies may be synchronized in order to schedule ultrasonic transmitting or receiving phases such that a tracked object 14 may determine its position according to the ultrasonic pulses 18 transmitted or received from the several sub-assemblies forming part of a base station 12.

In certain embodiments, radio synchronization may be performed at predetermined time windows. That is, in order to receive a radio synchronization packet, a tracked object 14 may need to have its radio receiver enabled during predetermined time slots. In selected embodiments, these time slots may be set up by a base station 12 using radio waves to communicate the timing and/or periodicity of one or more radio synchronization packets.

In selected embodiments, radio-based communication (e.g., encoded radio waves traveling from a radio transmitter or transceiver to a radio receiver or transceiver) may be used to transmit data from a tracked object 14 to a base station 12. Such data may include time-of-flight estimates corresponding to an ultrasonic transceiver, inertial measurements corresponding to an inertial measurement unit, or the like or a combination thereof. One or more tracked objects 14 may use pre-defined time slots to communicate such data to a base station 12. In certain embodiments, one or more tracked object 14 may be assigned a time slot and periodicity by a base station 12 via radio-based communication.

Figure 8:
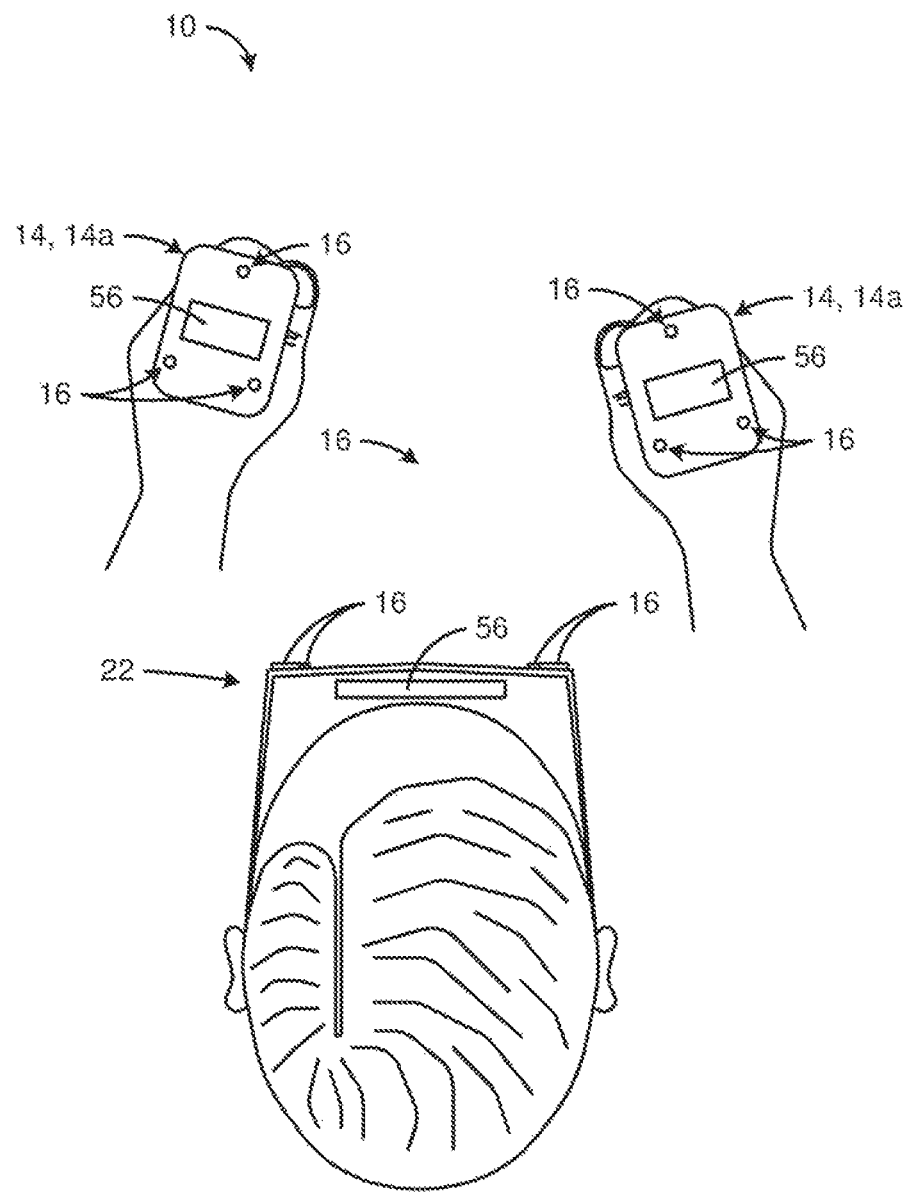
FIG. 8 is a schematic diagram illustrating a top view of an alternative embodiment of a system in accordance with the present invention as the system is being used by a human user.
Figure 9:
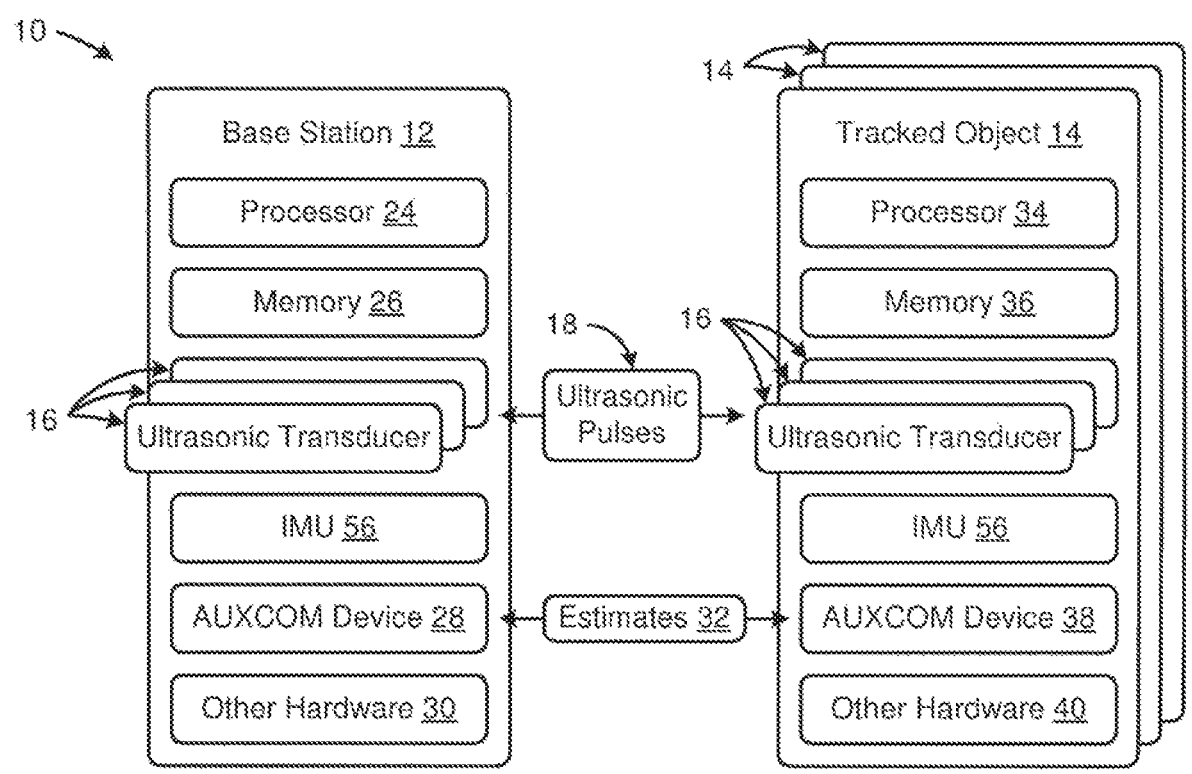
FIG. 9 is a schematic block diagram illustrating an alternative embodiment of the internal makeup of various components of a system in accordance with the present invention.

Referring to FIGS. 8 and 9, in selected embodiments, a base station 12 and/or one or more tracked objects 14 may include an IMU 56. An IMU 56 may be a sensor unit comprising a three-axis gyroscope and a three-axis accelerometer. Accordingly, an IMU 56 may be a six-axis device. In certain embodiments, an IMU 56 may also contain a three-axis magnetic field sensor, in which case it may be a nine-axis device.

In certain embodiments, an IMU 56 may be used to determine a location and/or orientation of a corresponding component 12, 14 in three dimensional space using dead-reckoning. Accordingly, the linear acceleration measured by an IMU 56 in three orthogonal axes (ax, ay, az) and the rates of angular rotation measured by an IMU 56 in three orthogonal axes ($\omega x$, $\omega y$, $\omega z$) may be numerically integrated to provide a continuous estimate of the three-dimensional location (x, y, z) and orientation angles ($\theta x$, $\theta y$, $\theta z$) of a corresponding component 12, 14.

Because dead-reckoning is based on integration of rates of acceleration and rotation, it may require knowledge of the initial location and/or orientation of a corresponding component 12, 14. In selected embodiments, this initial information about the "state vector" of a component 12, 14 may be provided using measurements derived from one or more ultrasonic pulses 18.

As disclosed above, measurements derived from one or more ultrasonic pulses 18 traveling from a base station 12 to one or more tracked objects 14 or vice versa may be used to estimate both the location (x, y, z) and/or orientation ($\theta x$, $\theta y$, $\theta z$) of the tracked objects 14 relative to the base station 12. Additionally, in selected embodiments, sensor-fusion algorithms (e.g. Kalman filtering, related algorithms, or the like) may be used to fuse the relative location and/or orientation data derived from ultrasonic measurements with the IMU data to provide tracking (e.g., tracking across three to six degrees of freedom) of multiple (e.g., all) components 12, 14 within a system 10 (e.g., tracking of two tracked objects 14 in the form of hand-held controllers and an HMD 22 comprising a base station 12).

In such embodiments, no fixed base station 12 may be needed. Instead of measuring the range of each tracked object 14 relative to a fixed base station 12, sensor fusion may be performed using only relative range measurements (e.g., relative range measurements between an HMD 22 comprising a base station 12 and multiple tracked objects 14 in the form of hand-held controllers). In other words, the location and/or orientation of all components 12, 14 may be computed by fusing: (1) data from the IMU 56 of each component 12, 14; (2) a prior estimated "state" (e.g., location and orientation) of each component 12, 14; and (3) ultrasonically derived estimates 32 of relative position and/or orientation.

Such fusion in accordance with the present invention may remove all or substantially all accumulated error that would otherwise arise with the use of IMUs 56. For example, uncorrected rate bias drift encountered by an IMU 56 of a base station 12 (e.g., an IMU 56 within a base station 12 that forms part of an HMD 22) in the z-axis may cause the estimate for $\theta z$ to drift over time. However, by using the data (e.g., the inertial data from an IMU 56 and the relative location and/or position data derived from one or more ultrasonic pulses 18) corresponding to one or more tracked objects 14, the angular rate measured by an IMU 56 of the base station 12 (e.g., an IMU 56 forming part of an HMD 22) may be fused with the accelerations measured along the directions normal to the range vectors (x, y, z) between various (e.g., all) IMUs 56 within the system 10.

The rate bias drift that is uncorrelated with accelerations along the normal axes may be rejected by the filtering process. Similarly, the accelerations measured by one IMU 56 (e.g., an IMU 56 of a base station 12) may be augmented by accelerations measured by other IMUs 56 (e.g., IMUs 56 of one or more tracked objects 14) in order to improve the estimate of the absolute location (x, y, z) of the base station 12 (e.g., the absolute location of the HMD 22 comprising the base station 12). Only motions that are correlated on all the various components 12, 14 of a system 10 may be incorporated into the location estimate, which may allow uncorrelated acceleration bias drift to be rejected.

An example of the invention may include one or more of the following steps, functions, or structures:

moving at least one tracked object with respect to a base station;

transmitting one or more ultrasonic pulses from one of the base station and the at least one tracked object to the other of the base station and the at least one tracked object; and using at least one of time-difference-of-arrival measurements and time-of-flight measurements of the one or more ultrasonic pulses to estimate at least one of the relative location and relative orientation of the at least one tracked object with respect to the base station.

The example of the invention may also include one or more steps, functions, or structures set forth above combined with displaying visual content on a screen.

The example of the invention may also include one or more steps, functions, or structures set forth above combined with at least a portion of the visual content being virtual.

The example of the invention may also include one or more steps, functions, or structures set forth above combined with maintaining, during the displaying, the base station stationary with respect to the screen.

The example of the invention may also include one or more steps, functions, or structures set forth above combined with the base station comprising at least three ultrasonic transducers.

The example of the invention may also include one or more steps, functions, or structures set forth above combined with the at least one tracked object comprising at least one ultrasonic transducer.

The example of the invention may also include one or more steps, functions, or structures set forth above combined with tracking relative motion in three dimensional space between the base station and the at least one tracked object.

The example of the invention may also include one or more steps, functions, or structures set forth above combined with the tracking comprising performing, by each of the at least three ultrasonic transducers, one of transmitting and receiving one or more ultrasonic pulses.

The example of the invention may also include one or more steps, functions, or structures set forth above combined with the tracking further comprising performing, by the at least one ultrasonic transducer, the other of transmitting and receiving the one or more ultrasonic pulses.

The example of the invention may also include one or more steps, functions, or structures set forth above combined with the tracking further comprising using at least one of time-difference-of-arrival and time-of-flight of the one or more ultrasonic pulses to estimate a location of the at least one object with respect to the base station in three dimensional space.

The example of the invention may also include one or more steps, functions, or structures set forth above combined with altering, based on the tracking, the at least a portion of the visual content.

The example of the invention may also include one or more steps, functions, or structures set forth above combined with altering, based on the tracking, the at least a portion of the visual content that is virtual.

The example of the invention may also include one or more steps, functions, or structures set forth above combined with each pulse of the one or more ultrasonic pulses being encoded with information identifying which transducer transmitted it.

The example of the invention may also include one or more steps, functions, or structures set forth above combined with the information being encoded using DPSK.

The example of the invention may also include one or more steps, functions, or structures set forth above combined with the information being encoded using QPSK.

The example of the invention may also include one or more steps, functions, or structures set forth above combined with the tracking further comprising transmitting, by a first transducer of the at least three ultrasonic transducers, a first pulse of the one or more ultrasonic pulses.

The example of the invention may also include one or more steps, functions, or structures set forth above combined with the tracking further comprising transmitting, by a second transducer of the at least three ultrasonic transducers, a second pulse of the one or more ultrasonic pulses.

The example of the invention may also include one or more steps, functions, or structures set forth above combined with the tracking further comprising transmitting, by a third transducer of the at least three ultrasonic transducers, a third pulse of the one or more ultrasonic pulses.

The example of the invention may also include one or more steps, functions, or structures set forth above combined with the transmitting the first pulse occurring before the transmitting of the second pulse.

The example of the invention may also include one or more steps, functions, or structures set forth above combined with a time delay between the transmitting of the first pulse and the transmitting of the second pulse being greater than a pulse duration of the first pulse plus a distance between the first and second transducers divided by a speed of sound in an environment surrounding the base station.

The example of the invention may also include one or more steps, functions, or structures set forth above combined with the transmitting of the second pulse occurring before the transmitting of the third pulse.

The example of the invention may also include one or more steps, functions, or structures set forth above combined with a time delay between the transmitting of the second pulse and the transmitting of the third pulse being greater than a pulse duration of the second pulse plus a distance between the second and third transducers divided by the speed of sound.

The example of the invention may also include one or more steps, functions, or structures set forth above combined with the tracking further comprising receiving, by the at least one ultrasonic transducer, the first, second, and third ultrasonic pulses.

The example of the invention may also include one or more steps, functions, or structures set forth above combined with the tracking further comprising using, by the at least one tracked object, time-difference-of-arrival of the first, second, and third ultrasonic pulses to estimate the relative orientation.

The example of the invention may also include one or more steps, functions, or structures set forth above combined with communicating, by the at least one object, to the base station the at least one of the relation location and the relative orientation.

The example of the invention may also include one or more steps, functions, or structures set forth above combined with the communicating comprising communicating the at least one of the relation location and the relative orientation via encoded radio waves.

The example of the invention may also include one or more steps, functions, or structures set forth above combined with the screen and the base station forming part of a single head-mounted display moving with respect to the earth while being worn by a human.

The example of the invention may also include one or more steps, functions, or structures set forth above combined with the screen being stationary with respect to the earth during the displaying.

The example of the invention may also include one or more steps, functions, or structures set forth above combined with the base station and the at least one object each comprising at least one inertial measurement unit.

The example of the invention may also include one or more steps, functions, or structures set forth above combined with applying a sensor-fusion algorithm to fuse inertial data output by one or more inertial measurement units of the base station and the at least one object with location data derived from the tracking.

The example of the invention may also include one or more steps, functions, or structures set forth above combined with using location data derived from the tracking to correct drift error associated with one or more of the inertial measurement units of the base station and the at least one object.

Another example of the invention may include one or more of the following steps, functions, or structures:
  a base station;
  at least one tracked object moving with respect to the base station;
  one or more processors;
  memory operably connected to the one or more processors; and
  the memory storing software programmed to use at least one of time-difference-of-arrival and time-of-flight of one or more ultrasonic pulses transmitted from one of the base station and the at least one tracked object to the other of the base station and the at least one tracked object to estimate at least one of the relation location and the relative orientation of the at least one tracked object with respect to the base station.

The example of the invention may also include one or more steps, functions, or structures set forth above combined with a screen displaying visual content.

The example of the invention may also include one or more steps, functions, or structures set forth above combined with at least a portion of the visual content being virtual.

The example of the invention may also include one or more steps, functions, or structures set forth above combined with the base station being stationary with respect to the screen.

The example of the invention may also include one or more steps, functions, or structures set forth above combined with the base station comprising at least three ultrasonic transducers.

The example of the invention may also include one or more steps, functions, or structures set forth above combined with the at least one object comprising at least one ultrasonic transducer.

The example of the invention may also include one or more steps, functions, or structures set forth above combined with the base station wherein each of the at least three ultrasonic transducers performs one of transmitting and receiving one or more ultrasonic pulses.

The example of the invention may also include one or more steps, functions, or structures set forth above combined with the at least one object wherein the at least one ultrasonic transducer performs the other of transmitting and receiving the one or more ultrasonic pulses.

The example of the invention may also include one or more steps, functions, or structures set forth above combined with at least one of the one or more processors forming part of the base station.

The example of the invention may also include one or more steps, functions, or structures set forth above combined with at least one of the one or more processors forming part of the at least one tracked object.

The example of the invention may also include one or more steps, functions, or structures set forth above combined with the memory storing software further programmed to alter, based on the relative location and/or the relative orientation, at least a portion of the visual content.

The example of the invention may also include one or more steps, functions, or structures set forth above combined with the memory storing software further programmed to alter, based on the relative location and/or the relative orientation, the at least a portion of the visual content that is virtual.

The example of the invention may also include one or more steps, functions, or structures set forth above combined with the screen and the base station forming part of a head-mounted display moving with respect to the earth while being worn by a human.

Figure 10A:
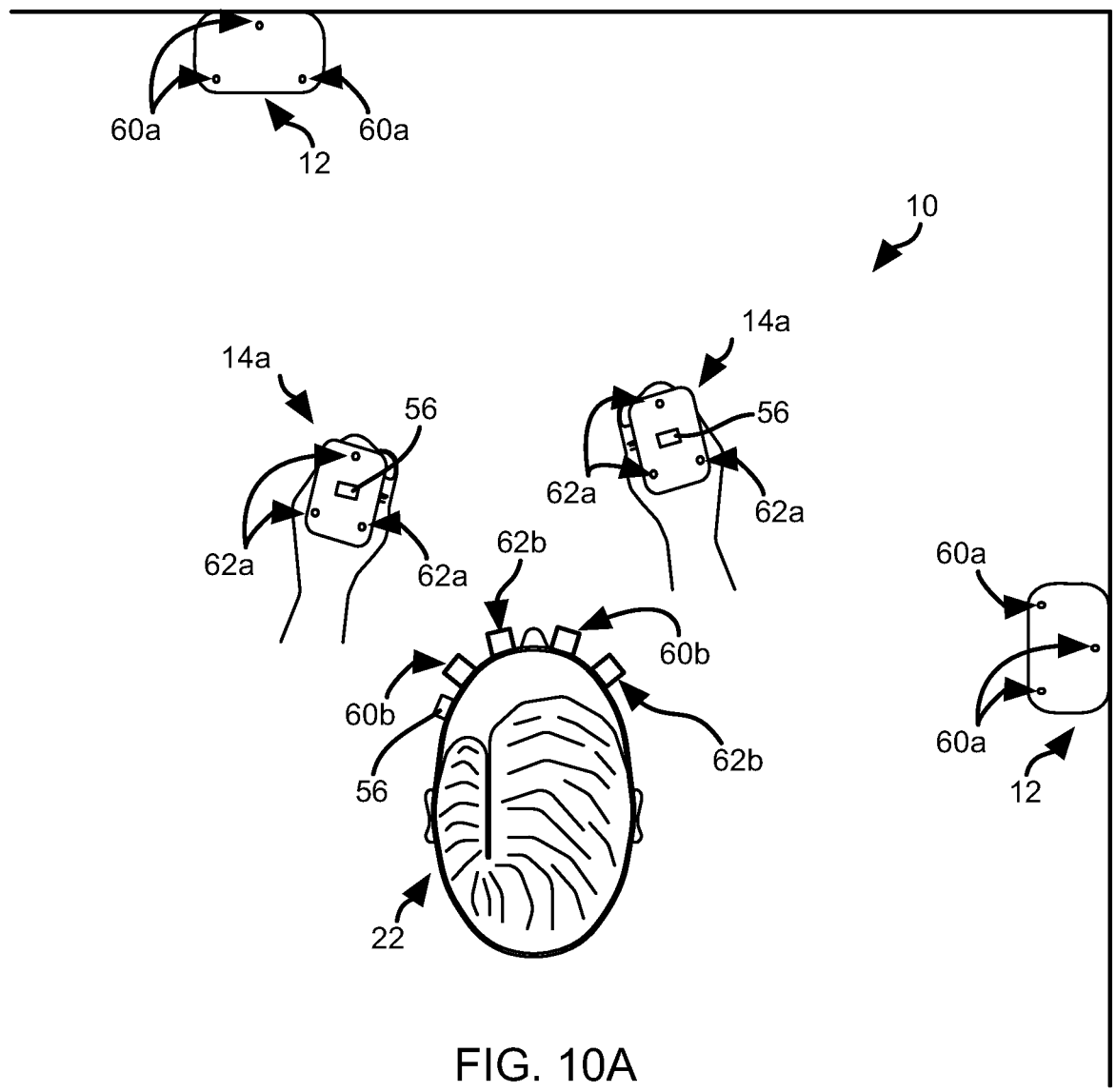
FIGS. 10A and 10B are schematic illustrations of alternative embodiments of an ultrasonic locating system in accordance with an embodiment of the present invention.
Figure 10B:
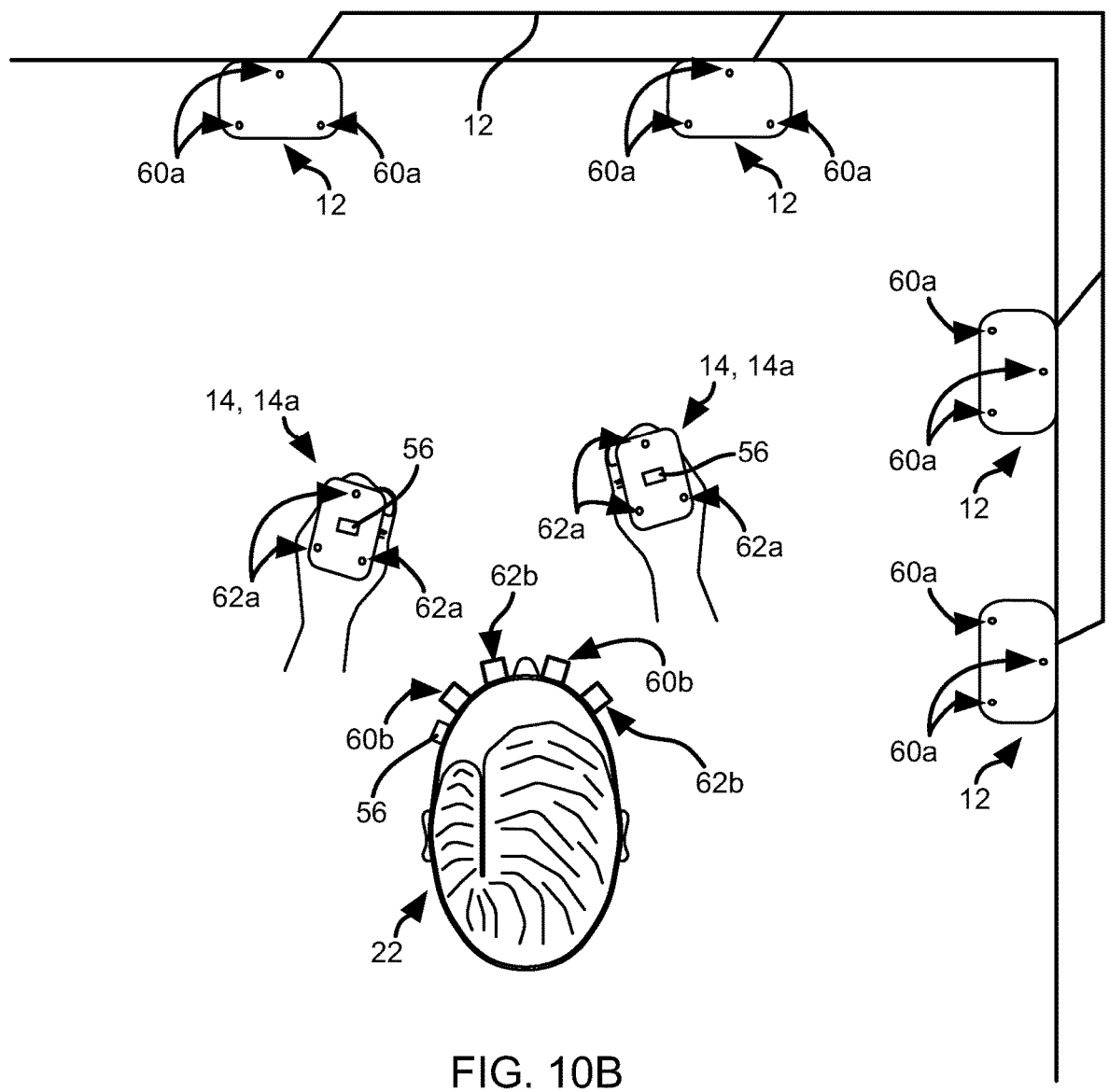

Referring to FIGS. 10A and 10B, the system 10 may have multiple fixed base stations 12. For example, the base stations 12 may be mounted to walls, floors, or ceilings of a structure or to any other fixed structures. In the illustrated embodiment, controllers 14a are used as the tracked objects 14, but other tracked objects 14 may also be used in the place of the controllers 14a in the following description. In some embodiments, each controller 14a incorporates an IMU 56. The HMD 22 may also incorporate an IMU 56.

In the illustrated embodiment there are two types of transducers used: ultrasonic transducers 60a, 60b operating at a first frequency and ultrasonic transducers 62a, 62b operating at a second frequency. In some embodiments described herein, e.g. the method 1300 of FIG. 13, dual-frequency operation is omitted. Accordingly, in such embodiments, the transducers 60a, 60b, 62a may operate at the same frequency and an additional set of transducers 62b on the HMD 22 may be omitted.

The transducers 60a, 60b, 62a, 62b on a particular device 12, 14a, 22 may be in groups of three arranged in a non-collinear configuration to permit use of the group of transducers to determine both position and orientation of the device 12, 14a, 22. For example, the position and orientation of a device 12, 14a, 22 may be determined according to six degrees of freedom: position along three mutually orthogonal axis and rotation about these or different axes. Position and orientation measurements may be expressed with regard to a "room coordinate system" that is defined with respect to an environment in which the system 10 is operated, e.g. walls, floor, ceiling, or other fixed structures. As described below, position and orientation of the controllers 14a may be determined with respect to a coordinate system defined with respect to the HMD 22. This facilitates displaying representations of the controllers 14 in a display of the HMD 22 inasmuch as they are rendered according to the HMD coordinate system.

As shown, base stations 12 include ultrasonic transducers 60a and the HMD 22 includes ultrasonic transducers 60b. The controllers 14a may include transducers 62a while the HMD includes ultrasonic transducers 62b. In this manner separate pulses at non-interfering frequencies may be used to determine the location of the HMD 22 and the controllers 14a, as described in the methods below. In some embodiments the first frequency and the second frequency are separated by at least 10 kHz. For example, the first frequency may be between 60 kHz and 90 kHz while the second frequency may be between 120 kHz to 240 kHz, or the first frequency may be between 30 kHz to 60 kHz and the second frequency may be between 70 kHz to 120 kHz. Many other frequency combinations are possible.

The base stations 12, controllers 14a, and HMD 22 may have some or all of the attributes of the base stations 12 and HMD 22 described hereinabove. In particular, the base stations 12, controllers 14a, and HMD 22 may include some or all of the components illustrated in FIG. 9 as forming part of a base station 12 or tracked object 14. As described in detail below, auxiliary communication devices 28, 38 may be incorporated into the base stations 12, controllers 14a, and HMD 22 and be configured to perform communication using electromagnetic signals such as in the radio frequency, microwave frequency, optical frequency, or any other communication band according to any protocol known in the art.

The auxiliary communication devices 28, 38 may communicate wirelessly or be connected by wires or optical fibers. For example, in the embodiment of FIG. 10B, the base stations 12 are coupled to one another by wires 64 or optical fibers 64.

The base stations 12 may include a single transducer 60a each or may include multiple transducers 60a. There are preferably at least three transducers 60a present distributed among one, two, three, or more base stations 12. The transducers 60a of the base stations 12 may be non-collinear.

Figure 11:
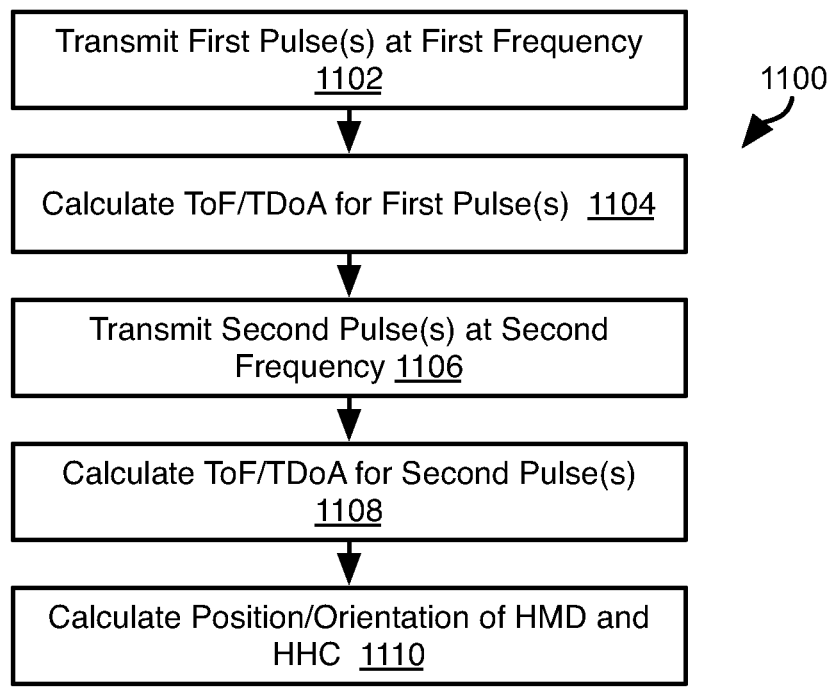
FIG. 11 is a process flow diagram of a method for using two frequencies to locate a head-mounted device (HMD) and hand-held controllers (HHCs) in accordance with an embodiment of the present invention.

Referring to FIG. 11, the illustrated method may be executed by the system 10 shown in FIG. 10A or 10B in order to track the position and orientation of the HMD 22 and controllers 14a.

The method 1102 may include transmitting 1102 one or more first pulses at a first frequency and calculating 1104 at least one of a time of flight (ToF) or time difference of arrival (TDoA). In particular, where the one or more first pulses are transmitted from the transducers 60b of the HMD 22, the ToF is the ToF from a transducer 60b to the transducers 60a of the base stations 12. As noted above, pulses from individual transducers 60a may be distinguished based on coding (PSK, QPSK, different frequencies, or any other coding scheme). A method by which ToF is calculated is described below with respect to FIG. 12. As described in detail below, ToF may be calculated based on a time difference between a time of receipt of the one or more first pulses and a synchronization signal transmitted in radio frequency, optical frequency, or over a wired connection.

The method 1100 may include transmitting 1102 a pulse from each transducer 60a of each base station 12 and calculating 1104 the pulse's ToF to the transducers 60b. In some embodiments, there are at least three transducers 60a such that there are at least three first pulses transmitted at step 1102. Pulses may be coded as described above (see description of FIG. 2) to enable them to be distinguished from one another. As described below with respect to FIG. 12, a synchronization signal may be transmitted preceding each first pulse or a single synchronization signal may be transmitted for a series of pulses including one pulse transmitted in sequence from each transducer 60a. Accordingly, the first pulses may be transmitted as a sequence rather than simultaneously in such embodiments.

In some embodiments, TDoA is calculated 1104 as an alternative to, or in addition to, measuring ToF. In such embodiments, transmitting 1102 the one or more first pulses and calculating 1104 the TDoA may be performed according to the method 1300 of FIG. 13. Specifically, as described below, the TDoA of pulses sent from synchronized base stations 12 and arriving at the HMD 22 may be measured.

The method 1100 may further include transmitting 1106 one or more second pulses and calculating 1108 the ToA and/or TDoA for the one or more second pulses. The one or more second pulses may be transmitted 1106 at the second frequency and therefore do not interfere with measurement of the one or more first pulses. The second pulses may be transmitted simultaneously with coding to enable distinguishing among them or transmitted in a sequence using a synchronization signal as described above with respect to step 1102.

Calculating 1108 the ToF or TDoA may include calculating the ToF and TDoA with respect to the controllers 14a. Accordingly, the one or more second pulses may be transmitted 1106 from the transducers 62b of the HMD 22 and the ToF and/or TDoA at the transducers 62a of the controllers 14a may be calculated 1108 according to receipt of the one or more second pulses by the transducers 62a of the controllers 14a. In some embodiments, there are at least three transducers 62b such that there are at least three second pulses transmitted at step 1106. The manner in which the ToF and/or TDoA are calculated based on the one or more second pulses is described below with respect to FIGS. 12-14. In embodiments where transducers 62b and 60a operate at different frequencies, steps 1002 and 1006 may be performed simultaneously because the pulses transmitted from transducers 62b to transducers 62a do not interfere with the pulses transmitted from transducers 60a to transducers 60b. As for step 1102, the one or more second pulses may be transmitted from different the transducers 62b simultaneously and be coded to enable them to be distinguished from one another upon receipt by a particular transducer 62a.

In some applications, the position and orientation of the trackers 14a with respect to the HMD 22 may change more rapidly than the position and orientation of the HMD 22. Accordingly, steps 1106-1108 may be performed more frequently then steps 1102-1104. For example, with a period of repetition that is one-sixth to three-quarters of the period of repetition of steps 1102-1104. Note that having the second frequency higher than the first frequency facilitates a shorter repetition interval since higher frequencies are attenuated more by air and echoes will therefore cease sooner. The shorter repetition interval is also made possible by the fact that the distance (and therefore time-of-flight) between the HMD 22 and trackers 14a is shorter than the distance between the HMD 22 and the base stations 12, as the former distance is limited to the user's arm length while the latter distance may be the size of an entire room.

The method 1100 may include calculating 1110 the position and/or orientation of the HMD 22 and controllers 14a (hand held controllers (HHC)) according to the ToF and/or TDoA measurements of steps 1104 and 1108. The manner in which the position and/or orientation is calculated according to the ToF and TDoA may be according to any method known in the art, including any of the approaches disclosed herein. In particular, the methods of FIGS. 12-14. As noted above, the controllers 14a may be tracked more frequently than the HMD 22, step 1110 may be performed more frequently with respect to the controllers 14a than for the HMD 22.

Note that FIG. 11 described using frequency to distinguish between the first pulses and the second pulses. However, other approaches may be used to distinguish between them. For example, the first and second pulses may be transmitted at different times or encoded using frequency division, code division (see, e.g., the description of encoding options with respect to FIG. 2), or any other encoding approach. Likewise, any encoding approach may be used to distinguish between first pulses or to distinguish between second pulses that are transmitted simultaneously or otherwise having the potential to overlap at a detector.

Figure 12:
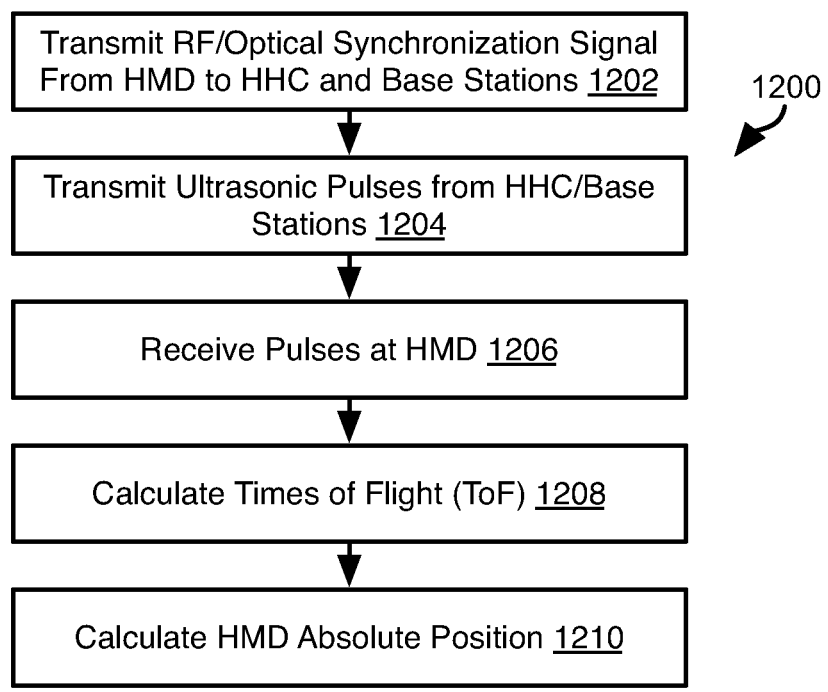
FIG. 12 is a process flow diagram of a method for locating the HMD using a synchronization signals and ultrasonic pulses in accordance with an embodiment of the present invention.

FIG. 12 illustrates a method 1200 for calculating the position and/or orientation of the HMD 22. The method 1200 may include transmitting 1202 a synchronization signal from the HMD 22. The synchronization signal may be a radio frequency signal, microwave signal, optical signal, or signal transmitted wirelessly or over one or more wires coupling the HMD 22 to the base stations 12 and/or controllers 14a.

The method 1200 may then include transmitting 1204 one or more pulses following transmission of the synchronization signal, such as after waiting for a predetermined delay. The base stations 12 and controllers 14a may store this predetermined delay and transmit the one or more pulses after waiting for the predetermined delay following receipt of the synchronization signal in order to accurately calculate the ToF of the ultrasonic pulse. In some embodiments, the value of the predetermined delay along with the relative locations of the base stations 12 may be transmitted to the HMD 22 and controllers 14a using an electromagnetic signal during an initialization phase prior to execution of step 1202. The relative locations of the base stations 12 may be determined according to steps 1302-1304 of the method 1300 described below.

The predetermined delay may be determined based on the distance between the base stations 12 according to the formula illustrated in FIG. 6, Td>D/c+Tp, where Td is the predetermined delay, D is the distance between two base stations, c is the speed of sound, and Tp is the duration of each ultrasonic pulse. The distance between base stations may be measured in a first calibration phase wherein the first base station 12 transmits an ultrasonic pulse that is received by all other base stations 12. The time-of-flight of this ultrasonic pulse is then used by each of the other base-station 12 to determine the distance to the first base station. This process is repeated, transmitting a pulse from a second base station to other base stations including the first base station, and so on for each base station until all the distances have been measured. A set of predetermined delays is then calculated for the base stations by assigning a sequence in which the base stations will transmit their pulses, then using the formula from FIG. 6 to define the predetermined delay of each base station in sequence. For example, where 3 base-stations are used, the three predetermined delays (Td1, Td2, Td3) can be calculated as: Td1=0 seconds, Td2>D21/c−Tp, Td3>Td2+(D32/c−Tp), where D21 is the distance between base stations 2 and 1 and D32 is the distance between base stations 3 and 2.

The controllers 14a and base stations 12 may transmit pulses at different frequencies to enable them to be distinguished from another as described above with respect to FIG. 11. Likewise, pulses transmitted simultaneously from multiple transducers 60a, 62a operating at the same frequency may be coded to enable distinguishing among them using any of the coding schemes described above.

The one or more pulses transmitted at step 1204 may be received 1206 by the transducers 60b, 62b of the HMD 22. A time of receipt T at each transducer 60b, 62b of each pulse of the one or pulses is recorded. The ToF may be calculated 1208 as the first time of receipt T minus a time of receipt S of the synchronization signal and the predetermined delay D (ToF=T−S−D).

Using the ToF of the one or more pulses from each transducer 60a, 62a, the position and orientation of the base stations 12 and controllers 14a relative to the HMD 22 may be calculated 1210. Where the position of the base stations 12 are fixed and known, the position and orientation of the HMD 22 relative to the base stations 12 may therefore be calculated based on the ToF of the one or more pulses to the transducers 60a of the base stations 12.

As noted above, the position and orientation of the controllers 14a may be calculated at shorter intervals than the HMD 22. Accordingly, the method 1200 may be repeated at different intervals with respect to transducers 60a, 60b than for the transducers 62a, 62b.

The three position coordinates (x, y, z) of an ultrasonic sensor 60a on a hand-held controller can be calculated relative to the HMD 22 using the time-of-flight of three or more ultrasonic pulses transmitted by three or more ultrasonic sensors 60b with known positions on the HMD 22 using trilateration or an equivalent algorithm. When the three position coordinates of two ultrasonic sensors with known locations on the controllers 14a are calculated in this manner, the orientation angles of the controllers 14a relative to the HMD 22 can also be calculated, however only two orientation angles can be determined (the controller can be rotated about a line drawn through the two ultrasonic sensors). When the positions of three non-collinear sensors with known locations on the controller 14a are calculated in this way, all three orientation angles of the controller 14a relative to the HMD 22 can be determined. In some embodiments, the orientation estimates are computed using a Kalman filter, which may be an extended Kalman filter (EKF). Orientation updates can therefore be made using only partial information, e.g. when less than three ultrasonic sensor positions are available. A similar method may be used to find the three position coordinates and three orientation angles of the HMD relative to three fixed base stations 12 located at known positions within a room.

Figure 13:
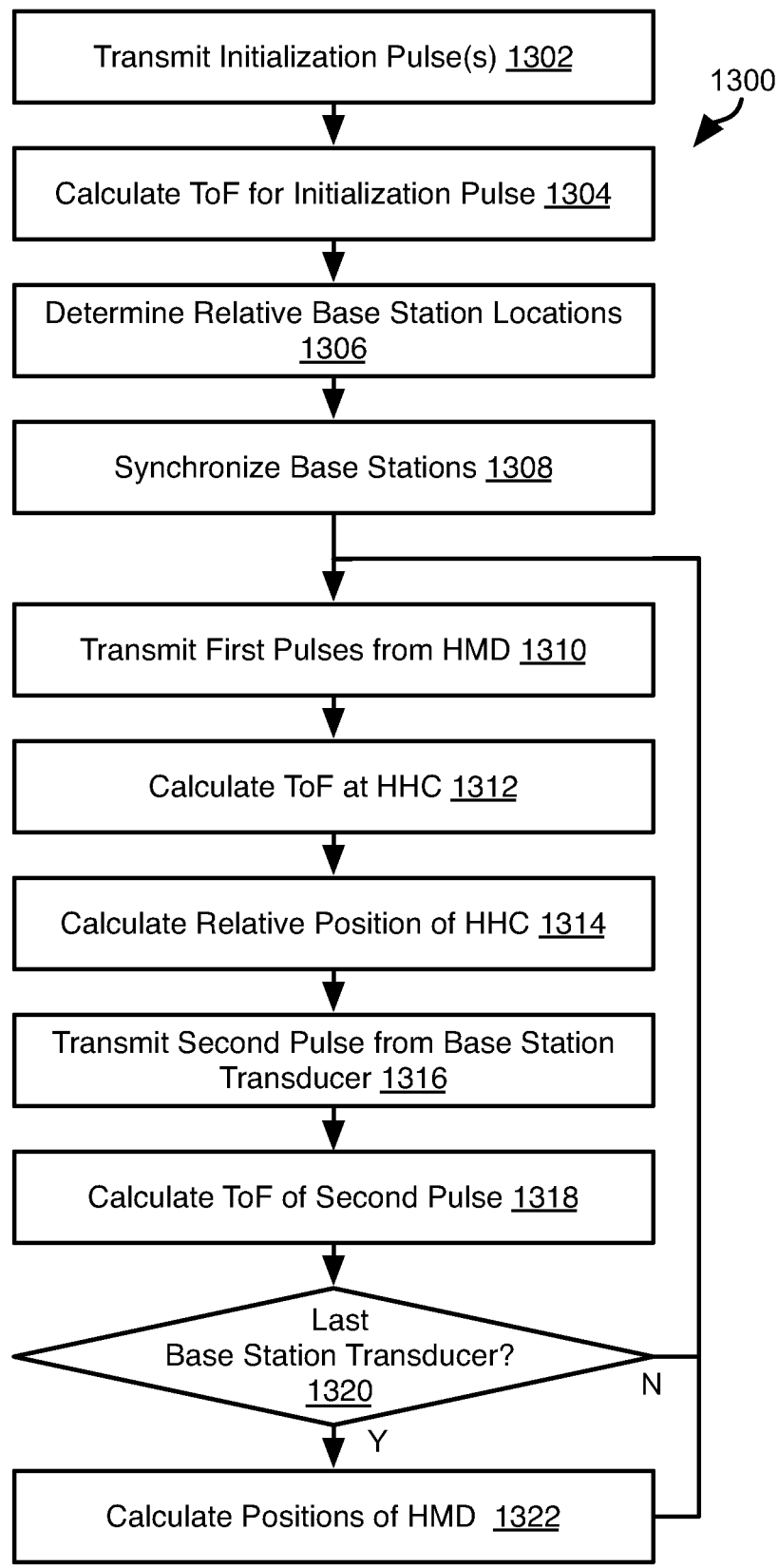
FIG. 13 is a diagram illustrating a system for locating the HMD and HHCs using synchronized fixed beacons in accordance with an embodiment of the present invention.

FIG. 13 illustrates a method 1300 for calculating the position and orientation of the HMD 22 and controllers 14a using fixed base stations 14a that are synchronized with respect to one another. The method 1300 is particularly effective where there are at least four base stations 12 distributed throughout a space such that they are not coplanar. The method 1300 may be performed using the system 10 of FIG. 10B in which the base stations 12 are coupled to one another by wires 64 or communicate by means of wireless electromagnetic signals.

The method 1300 may include an initialization phase 1302-1306 wherein the base stations determined their locations relative to one another. The manner in which this is performed may include any of the techniques described herein. For example, one of the base stations 12 may fill the role of the HMD 22 while the remaining base stations 12 operate in the role of the controllers 14 or base stations 12 according to any of the methods described above in order to determine the relative locations of the base stations 12 to one another.

Accordingly, a first base station 12 may transmit 1302 one or more initialization pulses that are received by the other base stations 12. The ToF of the one or more pulses may be calculated 1304. For example, the first base station 12 may transmit an electromagnetic synchronization signal followed by the one or more initialization pulses. The other base stations 12 may then compare the times of receipt of the synchronization signal and one or more initialization pulses to calculate the time of flight in the manner described above with respect to FIG. 12.

Using the measured ToF by the other base stations 12, the relative locations and orientations of the other base stations 12 relative to the first base stations may be determined 1306, such as in the manner described above with respect to FIG. 12. The relative locations of the base stations 12 as determined at step 1306 may be transmitted to the HMD 22, controllers 14a, or to whichever computing device calculates position and orientation according to the subsequent steps of the method 1300.

Note that steps 1302-1306 for determining the relative positions of the base stations 12 may be used to determine the locations of the base stations according to any of the approaches described in FIGS. 1-12.

The method 1300 may further include synchronizing 1308 the base stations 12. This may include transmitting an additional electromagnetic synchronization signal from one base station 12 to the remaining base stations 12 or from the HMD 22 to the base stations 12. In some embodiments, the same signal used in the initialization phase may be used to synchronize the base stations 12. The synchronization step 1308 may be repeated periodically to account for slight differences in clock speeds of the base stations 12. Note that step 1308 and the entirety of the method 1300 may include performing no synchronization with respect to the HMD 22 and controllers 14a. Accordingly, any electromagnetic communication channel or communication capabilities with the HMD 22 and controllers 14a may be omitted in such embodiments. Instead, in such embodiments, only the base stations 12 are synchronized.

The method 1300 may include transmitting 1310 first pulses from the transducers 62b of the HMD 22 that are received by the transducers 62a of the controllers 14a. Where there are three or more transducers 62b, this may include transmitting pulses from each of them, resulting in three or more first pulses. These first pulses are received by the transducers 62a and the ToF of each pulse to each transducer 62a is calculated 1312. As for other embodiments, the first pulses may be transmitted in a sequence at different predetermined delays or distinguished from one another by any of the encoding approaches described herein. In either case, a predetermined delay for each pulse may be defined relative to the synchronization signal enabling the time of transmission to be known and compared to a time of receipt of each pulse by each transducers 62a in order to determine the ToF of each pulse to each transducers 62a. The relative position of the and/or orientation of the controller 14a may then be calculated 1314 according to any approach described herein or as known in the art.

The method 1300 may further include transmitting 1316 a second pulse from one transducer 60a at a predetermined delay following the synchronization signal. The second pulse may be at a second frequency that is different and distinguishable from a first frequency at which the first pulses were transmitted 1310. For example, the second frequency may be lower than the first frequency. A ToF of the second pulse to each transducer 60b of the HMD 22 may be measured. In particular, the ToF may be calculated as a difference between a time of detection at a transducer 60b and the predetermined delay for the second pulse.

The method 1300 may include repeating steps 1310-1318 for each transducer 60a until a last transducer 60a is found 3120 to have transmitted 1316 a pulse and had corresponding ToFs to the transducers 60b calculated 1318.

Between iterations of steps 1310-1318, a delay may be imposed such that echoes from each second pulse may attenuate before the next second pulse is transmitted. Likewise, the predetermined delays at which pulses are transmitted 1310, 1316 will be incremented in each iteration to account for passage of time from a previous iteration of steps 1310-1318 and any inter-iteration delay. Alternatively, each iteration of steps 1310-1318 may be preceded by a synchronization step 1308 such that the predetermined delays are the same for each iteration.

The delay imposed between the second pulses may be determined from the initialization steps 1302-1306. In particular, the delay between second pulses may be selected such that echoes from a preceding second pulse will have attenuated to an acceptable level before a next second pulse is transmitted. For example, the delay between second pulses may be constrained to be some multiple of the time of flight between most separated transducers 60a, e.g. 2, 3, or some other multiple.

A relative position and/or orientation of the HMD 22 may then be calculated 1322 using the ToFs measured for each second pulse. The manner in which the position and/or orientation is calculated based on the ToFs may be according to any method described herein or known in the art. The method 1300 may then continue at step 1310 and transducers 60a will be looped through in sequence again as described above with respect to steps 1310-1320.

As is apparent from the description of FIG. 13, calculating of the position and/or orientation of the controllers 14a with respect to the HMD 22 occurs at a frequency three times that of calculating the relative position of the HMD 22 to the base stations 12. This is acceptable inasmuch as the controllers 14a will change position more often and more quickly than the HMD 22 in many applications.

Figure 14:
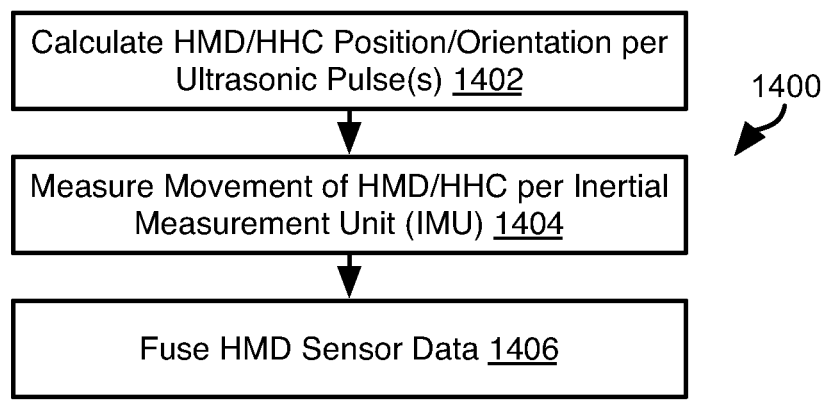
FIG. 14 is a process flow diagram of a method for locating the HMD and HHCs using ultrasonic pulses and inertial measurement units (IMU) in accordance with an embodiment of the present invention.

Referring to FIG. 14, the illustrated method 1400 may be executed by the system 10 to correct for jitter in position and orientation measurements using one or more IMUs 56.

The method 1400 may include calculating 1402 a position and/or orientation of the HMD 22 and controllers 14a using one or more ultrasonic pulses. This may include using any of the approaches described above with respect to FIGS. 1-13 for calculating the position and orientation of an HMD 22 and controllers 14a using one or more ultrasonic pulses. The result of step 14 is therefore a position and orientation measurement for the HMD 22 and controller for a particular point in time.

The method may further include measuring 1404 movement of the HMD 22 and controllers 14a using IMUs 56 mounted to the HMD 22 and controllers 14a. As known in the art, IMUs 56 such as accelerometers output an acceleration estimate which may then be integrated to obtain a velocity estimate or twice integrated to obtain a distance estimate. Each IMU 56 may include three accelerometers that measure linear acceleration along three mutually orthogonal axes. Each IMU 56 may also include three gyroscopes that measure angular rotation rate about the three mutually orthogonal axes or different axes. Each IMU 56 may also include three magnetometers that measure the orientation of the IMU relative to the Earth's magnetic field lines. Any configuration of accelerometers, magnetometers, and/or gyroscopes known in the art may be used to implement the IMUs 56. The result of step 1404 may be linear acceleration and angular rotation rate measurements for a given point in time, which may be the same or different from the point in time of the position and orientation measurement of step 1402. In particular, the repetition intervals of steps 1402 and 1404 may be different.

The relative ultrasonic position measurements determined at step 1402 and the acceleration and rotation rate measurements from step 1404 may then be fused 1406. In particular, the fusion step 1406 may include estimating the current orientation and position of the object using the acceleration, angular rotation rate, and magnetic-orientation measurements collected from the IMU. The fusion step 1406 may further include fusing the ultrasonic position measurements with the orientation and position estimates produced using the IMU data. When tracking is performed between two moving objects, such as between the HMD 22 and controllers 14a, the fusion step 1406 may be performed using measurements from the IMU on the HMD 22 and the IMU on the controller 14a which are subsequently fused with ultrasonic position measurements collected between transducers 62b on the HMD 22 and transducers 62a on the controller 14a.

In one embodiment, the fusion step 1406 comprises inputting the acceleration, rotation rate, and (optionally) magnetic orientation measurements from the IMUs 56 and the position and orientation measurements using ultrasonic pulses into an extended Kalman filter (EKF). The EKF functions by maintaining an estimate of the current position, orientation, and velocity (together known as the "state") of an object. When a new measurement (or set of measurements) becomes available, the EKF uses the new measurement and the previous state estimate to produce an updated estimate for the state. Because the EKF uses both new information (the new measurements) and a record of previous information (the previous state estimate), it has a smoothing effect that minimizes the error of the state estimate. Parameters within the EKF may be adjusted to weight the relative importance of a given measurement in producing the state estimate: for example, when the ultrasonic measurement has low signal level and is therefore noisy, the EKF may assign very little weight to this ultrasonic measurement when producing the updated state estimate, and may instead rely more on the IMU measurements and the previous state estimate. As noted above, the steps 1402 and 1404 may be performed at different rates. Accordingly, step 1406 may include inputting the position and orientation of step 1402 and the acceleration and angular rotation rate measurements of step 1404 as they are received.

Figure 15:
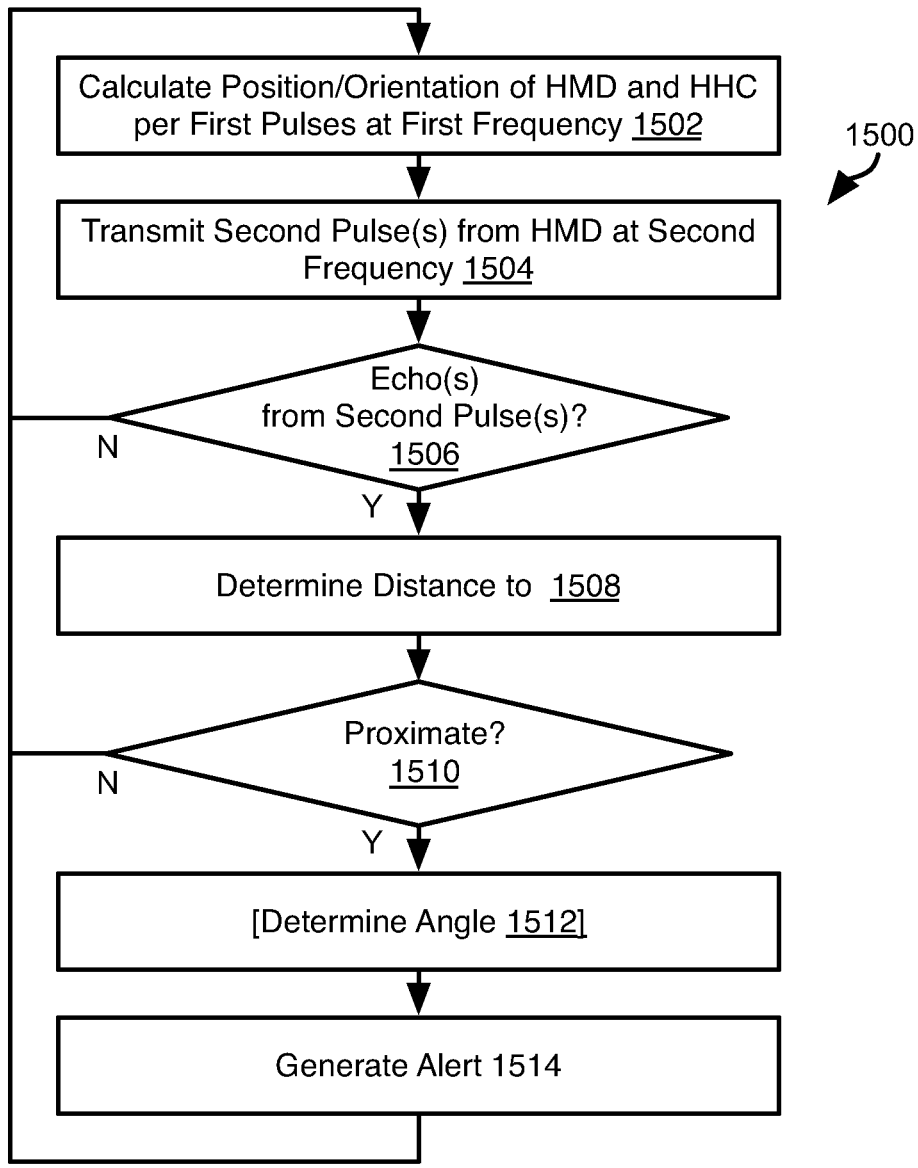
FIG. 15 is a process flow diagram of a method for detecting obstacles and locating the HMD and HHCs in accordance with an embodiment of the present invention.

Referring to FIG. 15, the illustrated method 1500 may be executed by the system 10 to perform obstacle detection. In a virtual reality system, the user's vision may be obscured by the HMD 22. Accordingly, performing obstacle detection may enhance user safety in some applications.

The method 1500 may include calculating 1502 a position and/or orientation of the HMD 22 and controllers 14*a* using one or more ultrasonic pulses. This may include using any of the approaches described above with respect to FIGS. 1-14 for calculating the position and orientation of an HMD 22 and controllers 14*a* using one or more ultrasonic pulses. The pulses used at step 1502 may be transmitted at a first frequency, which may be the same as, or different from, the first frequency described above with respect to FIG. 11.

The method 1500 may further include transmitting 1504 one or more second ultrasonic pulse at a second frequency that is different from the first frequency. The second frequency may be the same as, or different from, the second frequency described above with respect to FIG. 11.

For each second ultrasonic pulse, the method 1500 may include evaluating 1506 whether an echo of that pulse has been received. In particular, inasmuch as the second pulses are at a different frequency from the first pulses, echoes of the second pulses may be readily distinguished by their frequency. In particular, the first pulses may be transmitted or received using the transducers 60*b* of the HMD 22 whereas the second pulses may be transmitted from the second transducers 62*b* and the echoes may be detected by the second transducers 62*b*. The evaluation of step 1506 may include evaluating whether one or more of the detected echoes meets a threshold condition, such as signal strength above a threshold value.

If the condition of step 1506 is not met, then no action is taken for the one or more second pulses at step 1504. The method 1500 may then continue at step 1502 or 1504. The first pulses and second pulses are independent. Accordingly, step 1502 may be repeated at shorter or longer intervals than steps 1504 and 1506.

If the condition of step 1506 is met, then the method 1500 may include determining 1508 a distance to an obstacle corresponding to the one or more echoes. In particular, for each echo received for a given pulse, the time T that the echo was received after the given pulse was transmitted may be used to calculate the distance to the obstacle, e.g. S*T/2, where S is the speed of sound in air.

The method 1500 may further include evaluating 1510 whether the distance meets a threshold condition, i.e. is sufficiently proximate that collision is likely. For example, if the distance is less than 30 cm, or some other distance threshold, then the threshold condition may be determined 1510 to be met. If the condition of step 1510 is met, then the method 1500 may then include performing one or both of steps 1512 and 1514.

In some embodiments, the transducers 62*b* may have a narrow field of view. Accordingly, a detected echo may be inferred to be in the field of view of the transducer 62*b* and the angle to the obstacle may be determined 1512 to be within that field of view. In some embodiments, step 1504 may include transmitting second pulses from multiple transducers 62*b* having fields of view covering a sector around the user such as 360 degrees, 180 degrees, or some other sector around the HMD 22. The pulses may be transmitted simultaneously or in sequence. In this manner, the distance and angle to potential obstacles may be detected throughout that sector.

In other embodiments, the transducers 62*b* may have overlapping fields of view. Accordingly, two or more ToFs for an echo of the same pulse arriving at two or more transducers 62*b* may be combined using a multilateration algorithm to determine the angle of arrival of the returning echo.

The method 152 may further include generating 1514 an alert. Where only the distance is known, a general alert such as an audible beep, vibration alert, or visual alert displayed on the display of the HMD 22. Where the alert is visual, text indicating the distance may be displayed to the user. Where the angle is known, the angle to the obstacle may be indicated visually, audibly, or by some other means.

The method 1500 may then continue repeat at step 1502 or 1504

Note that FIG. 11 and its corresponding description describe a process wherein the first frequency is used to determine the position and orientation of the HMD 22 and the second frequency is used to determine the position and orientation of the controller 14*a*, such as relative to the HMD 22. Accordingly, where this approach is used, the method 1500 may include using pulses transmitted at a third frequency different from the first and second frequencies for performing obstacle detection. Accordingly, the HMD 22 may include three types of transducers, each type of transducer operating at a different frequency.

In addition, rather than using different frequencies to distinguish between pulses used for obstacle detections and those used for locating, different coding of pulses may be used to distinguish between these types of pulses.

Figure 16:
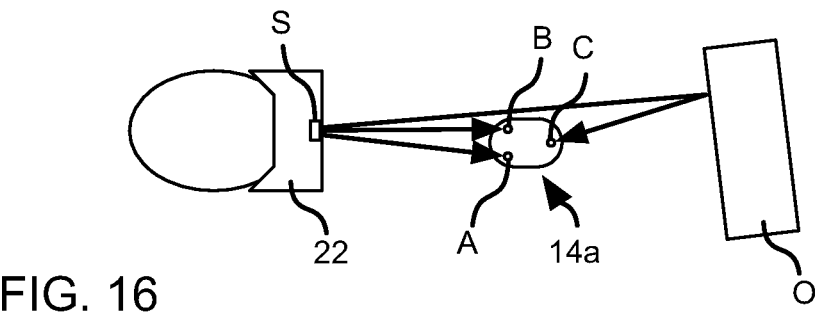
FIG. 16 is a diagram illustrating the detection of echoes of ultrasonic pulses in accordance with an embodiment of the present invention.

Referring to FIG. 16, in another approach to detecting obstacles, a pulse emitted from a transducer S (such as a transducer 62*b*) may be detected by one or more transducers A, B, C (e.g., transducers 62*a*) on a controller 14*a* along direct paths SA, SB, SC. The pulse may also be detected by one or more indirect paths by way of an echo from an object O, such as path SOC in FIG. 16. In some instances, a particular transducer, C in the illustrated example, may detect only an echo but not a direct pulse from the transducer S. Likewise, in some instances transducers, A and B in the illustrated example, may detect an ultrasonic pulse directly but not detect an echo from the object O.

Figure 17:
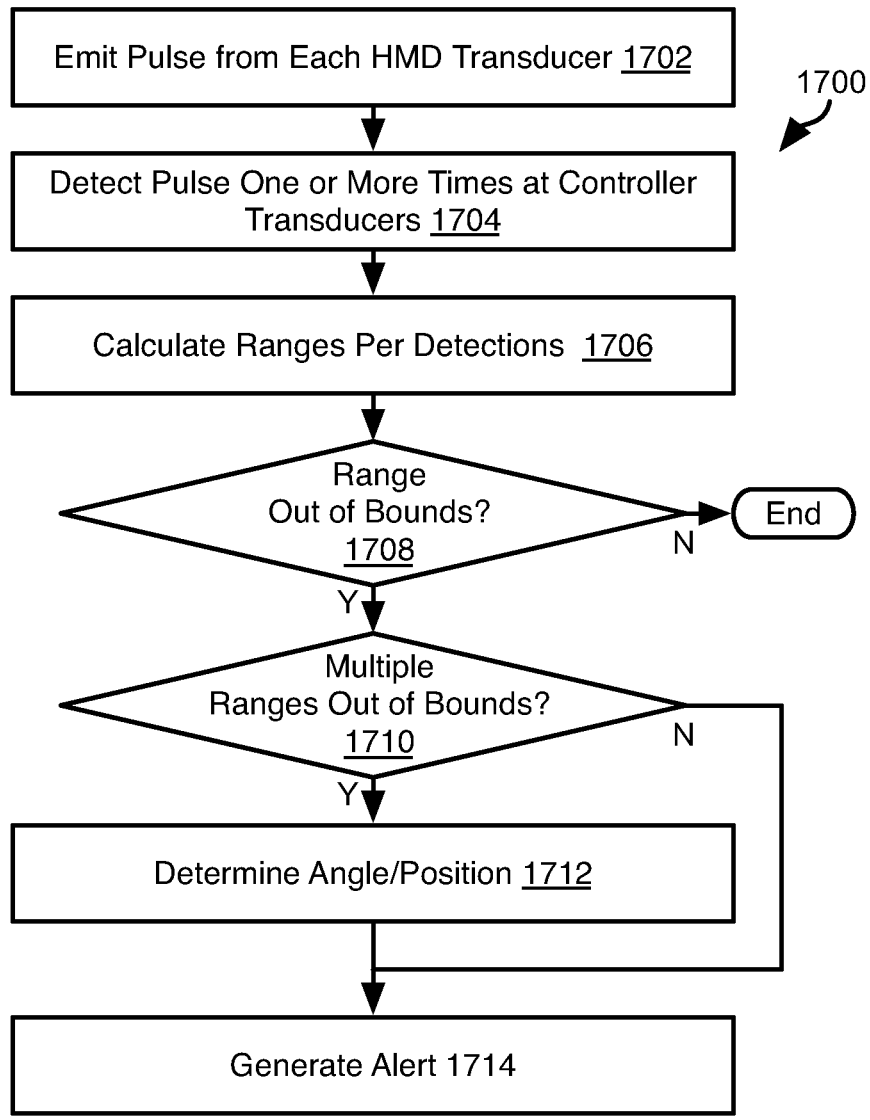
FIG. 17 is a process flow diagram of a method for detecting obstacles using echoes in accordance with an embodiment of the present invention.

Referring to FIG. 17, the illustrated method 1700 may be used to detect obstacles in the scenario illustrated in FIG. 16. The method 1600 may include emitting 1702 a pulse from each transducer of an HMD 22, e.g. each transducer used in locating the one or more controllers 14*a*. For example, this may include emitting a pulse from each transducer 62*b* of the HMD 22. As for other embodiments disclosed herein, the pulses from transducers 62b may be one or both of (a) encoded (frequency, phase, code, etc.) and transmitted simultaneously and (b) be transmitted following an electromagnetic synchronization signal and unique predetermined delays.

The pulses from each transducer 62b are detected 1704 one or more times by some or all of the transducer 62a of the controller 14a. For each transducer 62b, a range to each transducer 62a that detected the pulse from that transducer 62b may be calculated. The manner in which the range is calculated may be according to any method described hereinabove. Note that where an echo is received there may be multiple ranges for the same combination of transducer 62a and transducer 62b. Accordingly, for each detection a range may be calculated such that are multiple ranges for the same transducer 62a, 62b pair.

The method 1700 may further include evaluating 1708 whether one of the ranges of step 1706 is out of bounds. In particular, since all of the transducers of a controller are fixed relative to one another, the range to one of the transducers 62a should be within some threshold distance of the range to any other of the transducers 62a of the same controller.

For example, referring again to FIG. 16. The range measured using transducer A (R1A), transducer B (R1B), and transducer C (R1C) may be evaluated to determine whether one of the ranges indicates an echo. If R1C>R1A+ DAC+E, then R1C corresponds to an echo, where DAC is the known distance between transducers A and C and E is a factor to account for noise. For example, E may be equal to or greater than DAC or may be smaller than DAC. In the case, where transducer C does directly detect the pulse from transducer S, then there may be two ranges R1C (direct detection) and R2C (echo). Accordingly, R1C will be determined to be a direct detection, since it will be less then R1A+DAC+E.

The above approach may be applied to any pair of transducers x and y on a controller 14a. Accordingly, where a measured range Rx is greater than Ry+Dxy+E, the range Rx may be determined to correspond to an echo.

If no range is found 1708 to be out of bounds, then the echo detection method of FIG. 17 may end. Of course, the ranges obtained at step 1706 may be used for determining the position and orientation of the controller 14a according to any of the approaches used herein for any purpose.

If multiple ranges are found 1710 to be out of bounds, then the method 1700 may include attempting to determine 1712 an angular position, and possibly a two or three dimensional position of the obstacle. The method by which ranges are used to determine the angular, two, or three dimensional position may be according to any triangulation approach known in the art.

In either case, where a range is out of bound 1708 thereby indicating an obstacle, an alert may be generated 1714, such as described above with respect to step 1514 of the method 1500. Where an angular, two, or three dimensional position is known, the alert may communicate this fact to a user visibly, audibly, or by some other means.

Figure 18:
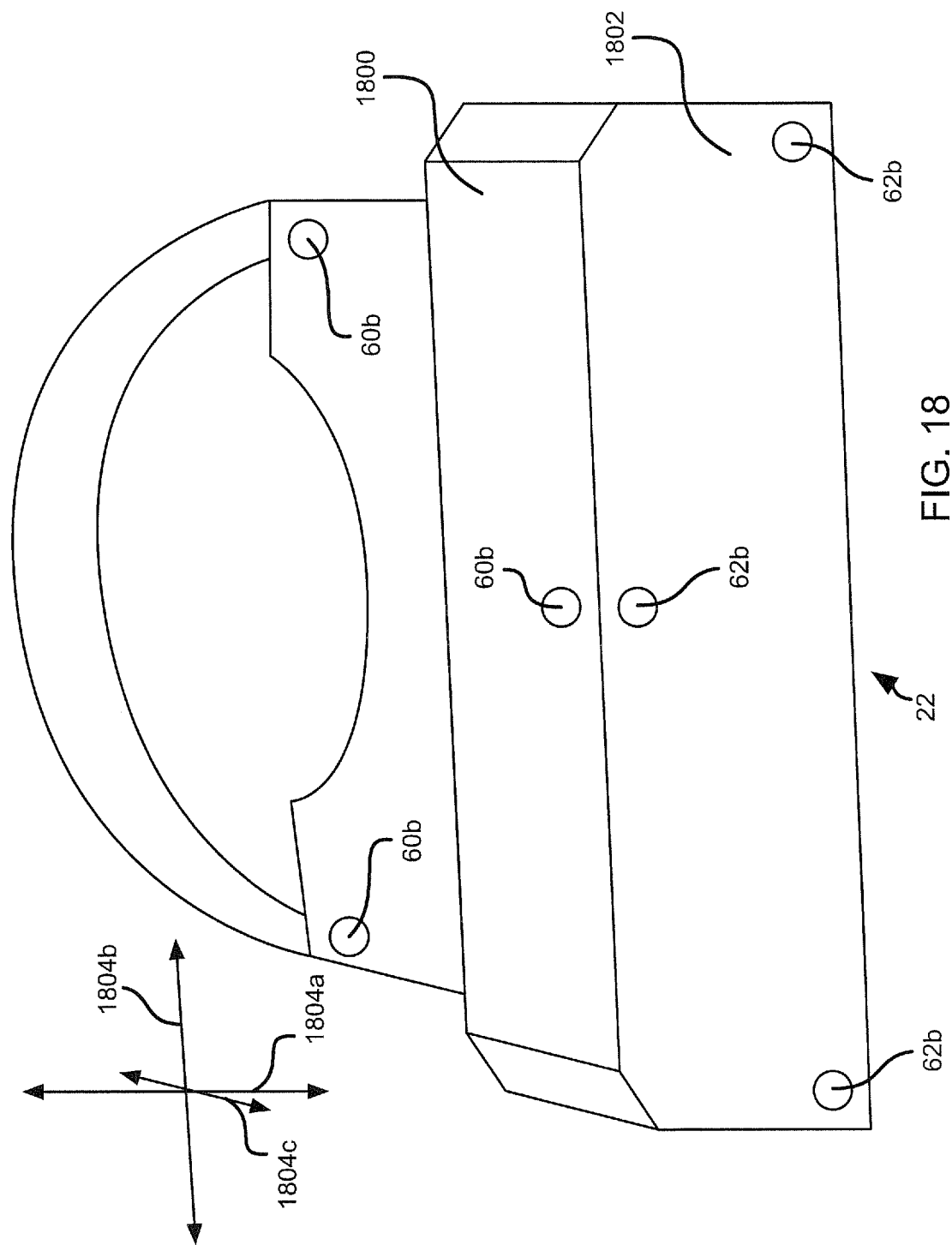
FIG. 18 is an isometric view of an HMD in accordance with an embodiment of the present invention.

Referring to FIG. 18, in some implementations, the base stations 12 are mounted high in a room, such as high on a wall or on a ceiling. In some embodiments, the HMD 22 may include the transducers 60b mounted to a surface 1800 of the HMD that faces generally upward when the HMD 22 is worn by a user. In contrast, the transducers 62b that interact with transducers 62a on the controllers 14a, may be mounted on a surface 1802 that faces generally horizontally when the HMD 22 is worn by a user.

The HMD 22 may be defined with respect to a vertical axis 1804a, a horizontal axis 1804b, and a longitudinal axis 1804c that are all mutually orthogonal to one another. The transducers 62b may be disposed in a plane parallel to the vertical and horizontal directions 1804a, 1804b. The surface 1602 may also be parallel to the vertical and horizontal directions 1804a, 1804b.

The transducers 60b may be disposed in a plane parallel to the horizontal and longitudinal directions 1804b, 1804c. Accordingly, the plane of the transducers 62b is perpendicular to the plane of the transducers 60b. When worn by a user, the plane of the transducers 60b is typically oriented such that the vertical direction of a space, i.e. the direction of gravity) is within 15 degrees of the vertical direction 1804a. In this manner, the transducers 60b will be likely to have a line of sight to transducers 60a when the user is standing in a space.

In this orientation, the plane of the transducers 62b will also face the controllers 14a held by the user and be more likely to have a line of sight with the transducers 62a. As is apparent in FIG. 16, the surface 1802 is positioned in front of the eyes of the wearer and the transducers 62b are distributed around the surface 1802 such that the field of view of the transducers 62b will overlap the field of view of the user's eyes when not wearing the HMD 22.

Figure 19:
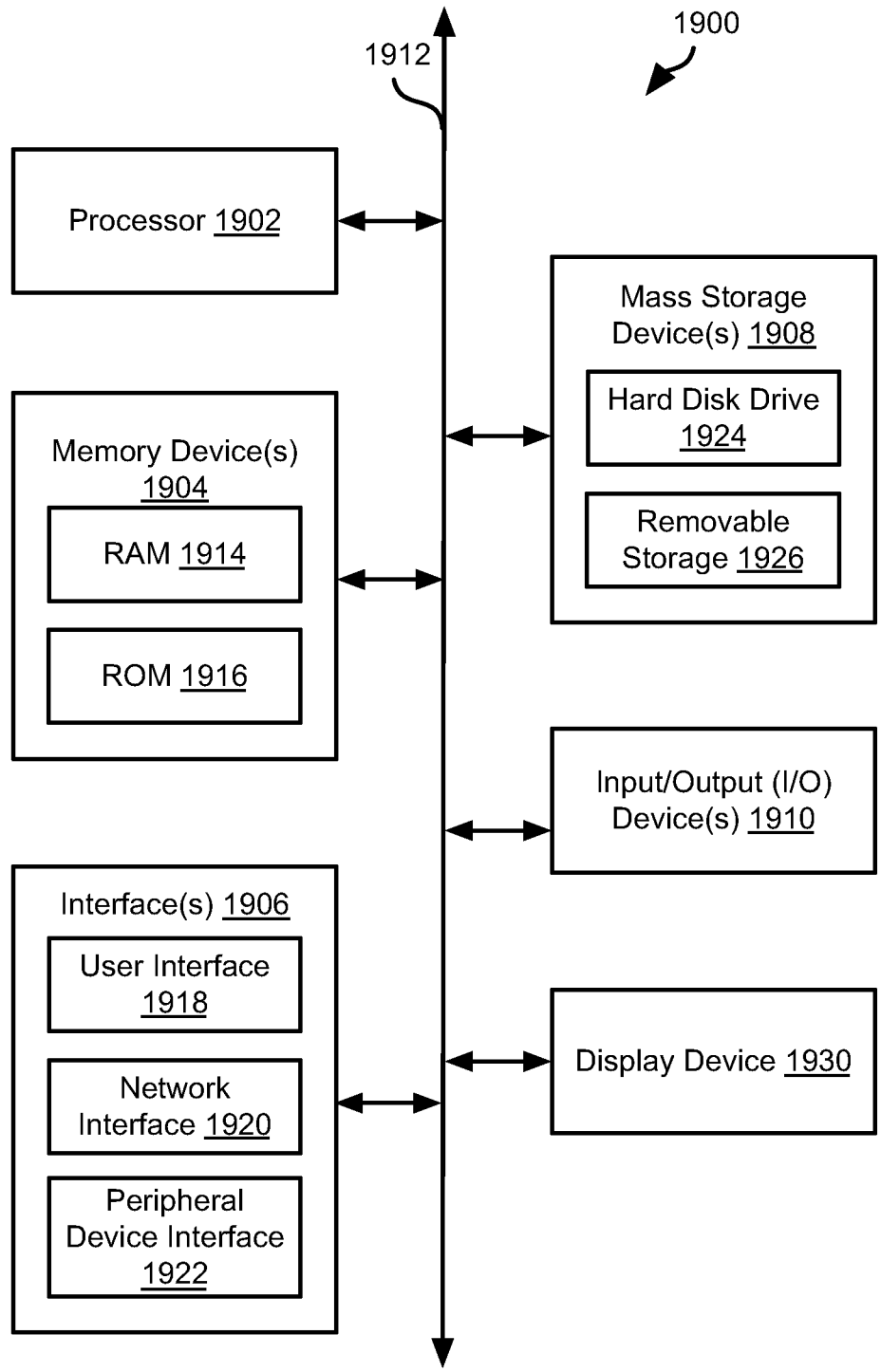
FIG. 19 is a schematic diagram of a computing device suitable for implementing the methods of the invention.

FIG. 19 is a block diagram illustrating an example computing device 1900. Computing device 1900 may be used to perform various procedures, such as those discussed herein. The HMD 22, controllers 14a, and base stations 12 may have some or all of the attributes of the computing device 1900.

Computing device 200 includes one or more processor(s) 1902, one or more memory device(s) 1904, one or more interface(s) 1906, one or more mass storage device(s) 1908, one or more Input/Output (I/O) device(s) 1910, and a display device 1930 all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media, such as volatile memory (e.g., random access memory (RAM) 1914) and/or nonvolatile memory (e.g., read-only memory (ROM) 1916). Memory device(s) 1904 may also include rewritable ROM, such as Flash memory.

Mass storage device(s) 1908 include various computer readable media, such as magnetic tapes, magnetic disks, optical disks, solid-state memory (e.g., Flash memory), and so forth. As shown in FIG. 19, a particular mass storage device is a hard disk drive 1924. Various drives may also be included in mass storage device(s) 1908 to enable reading from and/or writing to the various computer readable media. Mass storage device(s) 1908 include removable media 1926 and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, network interface cards, modems, lenses, CCDs or other image capture devices, and the like.

Display device 1930 includes any type of device capable of displaying information to one or more users of computing device 1900. Examples of display device 1930 include a monitor, display terminal, video projection device, and the like.

Interface(s) 1906 include various interfaces that allow computing device 1900 to interact with other systems, devices, or computing environments. Example interface(s) 1906 include any number of different network interfaces 1920, such as interfaces to local area networks (LANs), wide area networks (WANs), wireless networks, and the Internet. Other interface(s) include user interface 1918 and peripheral device interface 1922. The interface(s) 1906 may also include one or more peripheral interfaces such as interfaces for pointing devices (mice, track pad, etc.), keyboards, and the like.

Bus 1912 allows processor(s) 1902, memory device(s) 1904, interface(s) 1906, mass storage device(s) 1908, I/O device(s) 1910, and display device 1930 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900, and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for tracking objects comprising
   providing first ultrasonic transducers in a head-mounted display (HMD) worn by a user;
   providing second ultrasonic transducers mounted to an object;
   providing third ultrasonic transducers mounted to one or more beacons that have fixed positions, there being at least three third ultrasonic transducers;
   providing a first inertial measurement unit (IMU) mounted to the HMD;
   providing a second IMU mounted to the object;
   measuring times-of-flight of ultrasonic pulses transmitted between the first ultrasonic transducers, the second ultrasonic transducers, and the third ultrasonic transducers;
   calculating positions and orientations of the HMD and the object according to both of the times-of-flight and outputs of the first and second IMUs:
   (a) transmitting a first sequence of three or more first ultrasonic pulses between the HMD and the object;
   (b) measuring time-of-flight of the first sequence of three or more first ultrasonic pulses to obtain a measure of the position and orientation of the object relative to the HMD; and
   (c) transmitting a second sequence of three or more second ultrasonic pulses between the one or more beacons and the HMD; and
   (d) measuring times-of-flight of the second sequence of three or more second ultrasonic pulses to obtain a measure of the position and orientation of the HMD relative to the one or more beacons,
   wherein the first sequence and second sequence are a least one of—
   transmitted at different times and
   transmitted simultaneously such that the first ultrasonic pulses and second ultrasonic pulses are distinguishable using at least one of frequency division and code division.

2. The method of claim 1, further comprising:
   measuring the times-of-flight of the ultrasonic pulses with respect to a synchronization signal transmitted from one of the HMD and the one or more beacons, the synchronization signal being at least one of a radio frequency signal and an optical signal.

3. The method of claim 2, further comprising:
   transmitting a first sequence of three or more first ultrasonic pulses from the third ultrasonic transducers;

receiving the first sequence of first ultrasonic pulses by the first ultrasonic transducers and the second ultrasonic transducers;
fusing the times-of-flight of the first ultrasonic pulses to the first ultrasonic transducers with the outputs of the first IMU to obtain a measure of the position and orientation of the HMD relative to the one or more beacons; and
fusing the times-of-flight of the first ultrasonic pulses to the second ultrasonic transducers with the outputs of the second IMU to obtain a measure of the position and orientation of the object relative to the one or more beacons.

4. The method of claim 1, wherein each ultrasonic pulse within the first and second sequences of ultrasonic pulses is encoded to enable unique identification.

5. The method of claim 1, wherein the first ultrasonic pulses and second ultrasonic pulses are uniquely encoded using at least one of phase, frequency, and amplitude encoding.

6. The method of claim 1, further comprising:
calculating the position and orientation of the object relative to the HMD by fusing the measured times of flight of the first sequence of three or more first ultrasonic pulses with the outputs of the first and second IMUs using a sensor fusion algorithm; and
calculating the position and orientation of the HMD relative to the one or more beacons by fusing the measured times of flight of the second sequence of three or more second ultrasonic pulses transmitted between the one or more beacons and the HMD with outputs of the first IMU using the sensor fusion algorithm.

7. The method of claim 6, wherein the sensor fusion algorithm comprises at least one of a Kalman filter and an extended Kalman filter.

8. The method of claim 6, wherein the first ultrasonic transducers comprise a first set of first ultrasonic transducers operating at a first ultrasonic frequency and a second set of first ultrasonic transducers operating at a second ultrasonic frequency that is different from the first frequency; and
wherein the first sequence of three or more first ultrasonic pulses is transmitted at the first ultrasonic frequency between the HMD and objects and the second sequence of three or more ultrasonic pulses is transmitted at the second ultrasonic frequency between the one or more beacons and the HMD.

9. The method of claim 8, wherein the first ultrasonic frequency is higher than the second ultrasonic frequency.

10. The method of claim 8, further comprising repeating (a) and (b) at a first repetition period and repeating (c) and (d) at a second repetition period, the first repetition period being smaller than the second repetition period.

11. The method of claim 8, wherein the one or more beacons comprise three or more wireless beacons distributed in a space with non collinear locations, each having one or more third ultrasonic transducers and one of a radio transceiver, an optical receiver, and an optical transmitter.

12. The method of claim 11, further comprising:
(e) transmitting, by one of the HMD and the three or more wireless beacons, a synchronization signal comprising one of a radio frequency signal and an optical frequency signal; and
(f) transmitting at the first ultrasonic frequency, by the first set of first ultrasonic transducers, the first sequence of three or more first ultrasonic pulses; and (g) receiving, by the second ultrasonic transducers, the first sequence of three or more ultrasonic pulses; and
(h) transmitting at the second ultrasonic frequency, by the third ultrasonic transducers, a second sequence of one or more ultrasonic pulses; and
(i) receiving, by the HMD, the second sequence of one or more second ultrasonic pulses using the second set of first ultrasonic transducers.

13. The method of claim 12, wherein performing (e), (f), (g), and (h) comprises:
(j) performing (e), performing (f) and (g), and then performing (h) by transmitting a first pulse of the second sequence of one or more ultrasonic pulses from a first transducer of the third ultrasonic transducers; and
(k) on a next measurement cycle after performing (j), performing (e), performing (f) and (g), and then performing (h) by transmitting a second pulse of the second sequence of one or more ultrasonic pulses from a second transducer of the third ultrasonic transducers; and
(l) on a next measurement cycle after performing (k), performing (e), performing (f) and (g), and then performing (h) by transmitting a third pulse of the second sequence of one or more ultrasonic pulses from a third transducer of the third ultrasonic transducers.

14. The method of claim 13, further comprising assigning a predetermined delay to each of the first transducer, second transducer, and third transducer of the third ultrasonic transducers during an initialization phase prior to performing (e);
wherein performing (j) comprises performing (j) after waiting the predetermined delay assigned to the first transducer of the third ultrasonic transducers after performing (e);
wherein performing (k) comprises performing (k) after waiting the predetermined delay assigned to the second transducer of the third ultrasonic transducers after performing (e); and
wherein performing (l) comprises performing (l) after waiting the predetermined delay assigned to the third transducer of the third ultrasonic transducers after performing (h).

15. The method of claim 14, further comprising, during the initialization phase, transmitting calibration ultrasonic pulses between the three or more beacons and determining the locations of the three or more beacons relative to one another according to times-of-flight of the calibration ultrasonic pulses.

16. The method of claim 12, further comprising waiting for a predetermined delay between (j) and (k) and between (k) and (l).

17. The method of claim 1, wherein the one or more beacons comprise one beacon having the three or more third ultrasonic transducers mounted thereto and further comprising one of a radio transceiver, an optical receiver, and an optical transmitter.

18. The method of claim 17, wherein the first ultrasonic transducers comprise a first set of first ultrasonic transducers operating at a first frequency and a second set of first ultrasonic transducers operating at a second frequency, the method further comprising:
transmitting, by one of the HMD and the one beacon, a synchronization signal comprising one of a radio frequency signal and an optical frequency signal; and
transmitting at the first ultrasonic frequency, by the first set of first ultrasonic transducers, a first sequence of three or more first ultrasonic pulses; and receiving, by the object, the first sequence of three or more first ultrasonic pulses; and transmitting at a second ultrasonic frequency, by the third ultrasonic transducers, a second sequence of three or more second ultrasonic pulses each separated in time by a predetermined delay; and receiving, by the second set of first ultrasonic transducers, the second sequence of three or more second ultrasonic pulses.

19. The method of claim 1, wherein (a) is performed by the first ultrasonic transducers, the method further comprising:

subsequent to performing (a), detecting, using the first ultrasonic transducers one or more echoes of the first ultrasonic pulses; and determining a distance to at least one structure according to times of arrival of the one or more echoes.

20. The method of claim 1, wherein: (a) is performed by the first ultrasonic transducers, the method further comprising:

receiving, by the second ultrasonic transducers, the first ultrasonic pulses;

subsequent to receiving the first ultrasonic pulses, detecting one or more echoes of the first ultrasonic pulses;

determining a time delay between arrival of the first ultrasonic pulses and the one or more echoes of the first ultrasonic pulses;

determine a distance to a surface according to the time delay.

21. A system comprising a head-mounted display for wearing by a user and including first ultrasonic transducers and a first inertial measurement unit (IMU);

an object including second ultrasonic transducers and a second IMU, the object being movable with respect to a space;

one or more beacons having third ultrasonic transducers mounted thereto, there being at least three third ultrasonic transducers, the one or more beacons being fixed relative to the space;

one or more processing devices programmed to—
measure times-of-flight of ultrasonic pulses transmitted between the first ultrasonic transducers, the second ultrasonic transducers, and the third ultrasonic transducers; and
calculating positions and orientations of the HMD and the object according to both of the times-of-flight and outputs of the first and second IMUs;

wherein the one or more processing devices are further programmed to:
(a) invoke transmitting of a first sequence of three or more first ultrasonic pulses between the HMD and the object;
(b) measure times-of-flight of the first sequence of three or more first ultrasonic pulses to obtain a measure of the position and orientation of the object relative to the HMD; and
(c) invoke transmitting of a second sequence of three or more second ultrasonic pulses between the one or more beacons and the HMD;
(d) measure times-of-flight of the second sequence of three or more second ultrasonic pulses to obtain a measure of the position and orientation of the HMD relative to the one or more beacons, wherein the first sequence and second sequence are at least one of—
transmitted at different times and transmitted simultaneously and distinguishable using at least on of phase, frequency, and amplitude encoding;
calculate the position and orientation of the object relative to the HMD by fusing the measured times of flight of the first sequence of three or more first ultrasonic pulses with the outputs of the first and second IMUs using a sensor fusion algorithm; and
calculate the position and orientation of the HMD relative to the one or more beacons by fusing the measured times of flight of the second sequence of three or more second ultrasonic pulses transmitted between the one or more beacons and the HMD with outputs of the first IMU using the sensor fusion algorithm;

wherein the sensor fusion algorithm comprises at least one of a Kalman filter and an extended Kalman filter;

wherein the first ultrasonic transducers comprise a first set of first ultrasonic transducers operating at a first ultrasonic frequency and a second set of first ultrasonic transducers operating at a second ultrasonic frequency that is different from the first frequency; and wherein the first sequence of three or more first ultrasonic pulses is transmitted at the first ultrasonic frequency between the HMD and objects and the second sequence of three or more ultrasonic pulses is transmitted at the second ultrasonic frequency between the one or more beacons and the HMD.

22. The system of claim 21, wherein the one or more processing devices are further programmed to:

measure the times-of-flight of the ultrasonic pulses with respect to a synchronization signal transmitted from one of the HMD and the one or more beacons, the synchronization signal being at least one of a radio frequency signal and an optical signal;

invoke transmitting of a first sequence of three or more first ultrasonic pulses from the third ultrasonic transducers;

detect receiving of the first sequence of first ultrasonic pulses by the first ultrasonic transducers and the second ultrasonic transducers;

fuse the times-of-flight of the first ultrasonic pulses to the first ultrasonic transducers with the outputs of the first IMU to obtain a measure of the position and orientation of the HMD relative to the one or more beacons; and fuse the times-of-flight of the first ultrasonic pulses to the second ultrasonic transducers with the outputs of the second IMU to obtain a measure of the position and orientation of the object relative to the one or more beacons.

23. The system of claim 21, wherein the one or more beacons comprise three or more wireless beacons distributed in a space with non collinear locations, each having one or more third ultrasonic transducers and one of a radio transceiver, an optical receiver, and an optical transmitter;

wherein the one or more processing devices are further programmed to:
(e) invoke transmitting, by one of the HMD and the three or more wireless beacons, a synchronization signal comprising one of a radio frequency signal and an optical frequency signal; and
(f) invoke transmitting at the first ultrasonic frequency, by the first set of first ultrasonic transducers, the first sequence of three or more first ultrasonic pulses; and
(g) detect receiving, by the second ultrasonic transducers, the first sequence of three or more ultrasonic pulses; and (h) invoke transmitting at the second ultrasonic frequency, by the third ultrasonic transducers, a second sequence of one or more ultrasonic pulses; and
(i) detect receiving, by the HMD, the second sequence of one or more second ultrasonic pulses using the second set of first ultrasonic transducers;
wherein the one or processing devices are programmed to perform (e), (f), (g), and (h) by:
(j) performing (e), (f), and (g), and then performing (h) by transmitting a first pulse of the second sequence of one or more ultrasonic pulses from a first transducer of the third ultrasonic transducers; and
(k) after performing (j), performing (e), (f), and (g), and then performing (h) by transmitting a second pulse of the second sequence of one or more ultrasonic pulses from a second transducer of the third ultrasonic transducers; and
(l) after performing (k), performing (e), (f), and (g), and then performing (h) by transmitting a third pulse of the second sequence of one or more ultrasonic pulses from a third transducer of the third ultrasonic transducers.

\* \* \* \* \*